US012632983B2

(12) United States Patent
Zhou et al.

(10) Patent No.: US 12,632,983 B2
(45) Date of Patent: May 19, 2026

(54) VIDEO FRAME PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: Yi Zhou, Shenzhen (CN); Xiaoming Yu, Shenzhen (CN); Yang Yi, Shenzhen (CN); Chengwei Peng, Shenzhen (CN); Yiting Xu, Shenzhen (CN); Feng Li, Shenzhen (CN); Xiaoxiang Zuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 260 days.

(21) Appl. No.: 18/630,578

(22) Filed: Apr. 9, 2024

(65) Prior Publication Data

US 2024/0257386 A1     Aug. 1, 2024

Related U.S. Application Data

(63) Continuation of application No. PCT/CN2023/099877, filed on Jun. 13, 2023.

(30) Foreign Application Priority Data

Aug. 16, 2022     (CN) .......................... 202210980758.0

(51) Int. Cl.
*G06T 7/73*          (2017.01)
*G06T 5/20*          (2006.01)
(Continued)

(52) U.S. Cl.
CPC ................. *G06T 7/73* (2017.01); *G06T 5/20* (2013.01); *G06T 5/70* (2024.01); *G11B 27/036* (2013.01);
(Continued)

(58) Field of Classification Search
CPC .... G06T 7/73; G06T 5/20; G06T 5/70; G06T 2207/10016; G06T 2207/30201;
(Continued)

(56) References Cited

U.S. PATENT DOCUMENTS

2018/0293437 A1* 10/2018 Dempsey ............... H04N 23/60
2022/0215560 A1* 7/2022 Ji .............................. G06T 7/90
(Continued)

FOREIGN PATENT DOCUMENTS

CN          110544272 A     12/2019
CN          111836072 A  * 10/2020   ....... H04N 21/23418
(Continued)

OTHER PUBLICATIONS

International Search Report of PCT/CN2023/099877 dated Sep. 19, 2023 [PCT/ISA/210].
(Continued)

*Primary Examiner* — Jennifer Mehmood
*Assistant Examiner* — Vaisali Rao Koppolu
(74) *Attorney, Agent, or Firm* — Sughrue Mion, PLLC

(57)          ABSTRACT

A video frame processing method, performed by a computer device, includes: receiving video frames carrying noise, wherein the video frames include an object; extracting poses of a part of the object; determining deflection degree values of the part based on the poses; generating a control signal based on the deflection degree values; obtaining updated deflection values based on backlash filtering of the control signal; and performing image processing on the video frames based on the updated deflection values.

20 Claims, 16 Drawing Sheets

(51) Int. Cl.
G06T 5/70 (2024.01)
G11B 27/036 (2006.01)

(52) U.S. Cl.
CPC .............. *G06T 2207/10016* (2013.01); *G06T 2207/30201* (2013.01)

(58) Field of Classification Search
CPC . G06T 2207/20084; G06T 2207/20182; G06T 5/50; G06T 5/60; G06T 7/74; G11B 27/036; H04N 19/20; H04N 19/51; G06V 20/46; G06V 40/10; G06V 40/20
See application file for complete search history.

(56) References Cited

U.S. PATENT DOCUMENTS

| | | | |
|---|---|---|---|
| 2022/0309780 A1* | 9/2022 | Chen .................... | G06V 40/168 |
| 2023/0245271 A1* | 8/2023 | Song .................... | G06V 40/171 |
| | | | 382/284 |
| 2023/0368343 A1* | 11/2023 | Shin .................. | H04N 23/6811 |

FOREIGN PATENT DOCUMENTS

| | | | | | |
|---|---|---|---|---|---|
| CN | 112329740 A | * | 2/2021 | .......... | G06V 40/165 |
| CN | 113497861 A | * | 10/2021 | .............. | H04N 5/21 |
| CN | 113766117 A | | 12/2021 | | |
| CN | 114363623 A | * | 4/2022 | .............. | G06N 3/04 |

OTHER PUBLICATIONS

Written Opinion of PCT/CN2023/099877 dated Sep. 19, 2023 [PCT/ISA/237].

* cited by examiner

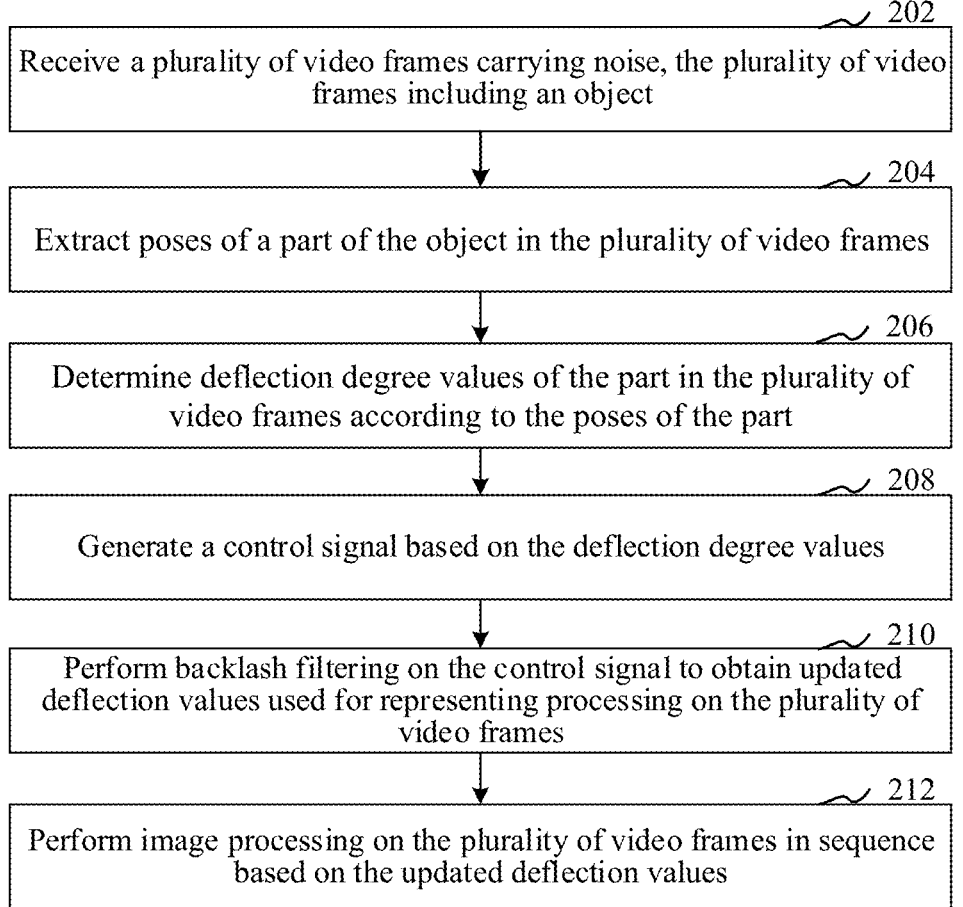

202

Receive a plurality of video frames carrying noise, the plurality of video frames including an object

204

Extract poses of a part of the object in the plurality of video frames

206

Determine deflection degree values of the part in the plurality of video frames according to the poses of the part

208

Generate a control signal based on the deflection degree values

210

Perform backlash filtering on the control signal to obtain updated deflection values used for representing processing on the plurality of video frames

212

Perform image processing on the plurality of video frames in sequence based on the updated deflection values

FIG. 2

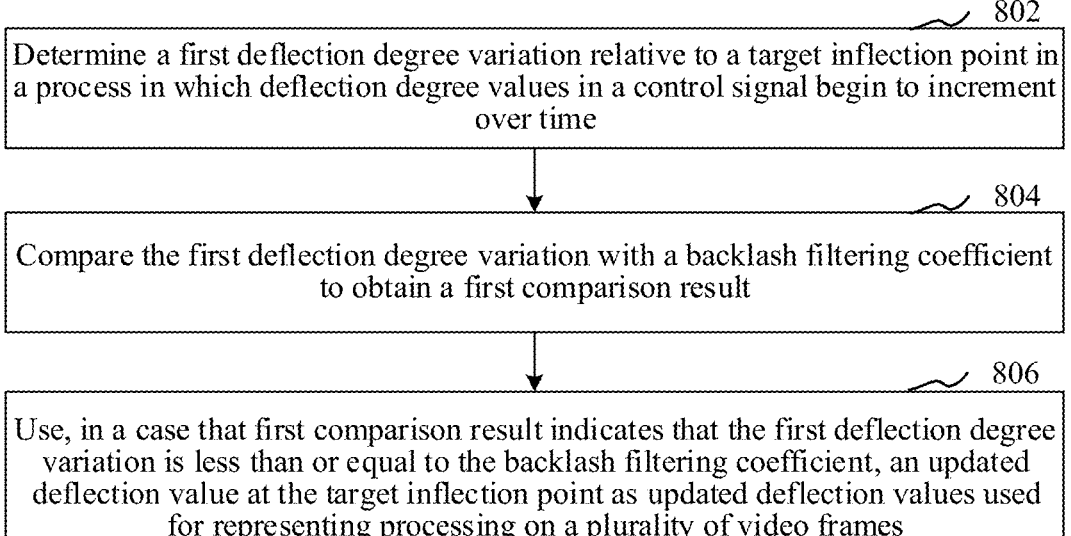

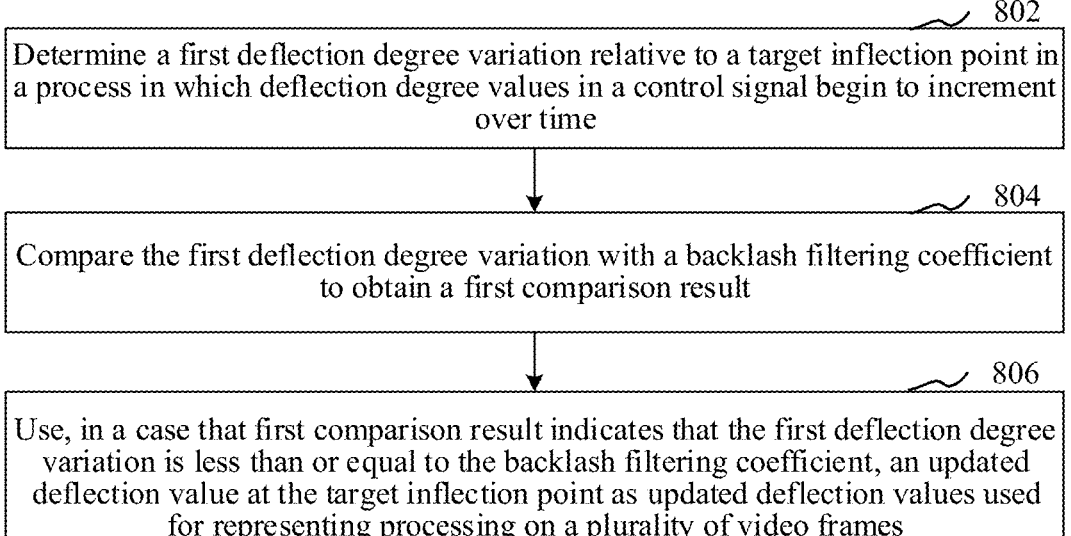

802

Determine a first deflection degree variation relative to a target inflection point in a process in which deflection degree values in a control signal begin to increment over time

804

Compare the first deflection degree variation with a backlash filtering coefficient to obtain a first comparison result

806

Use, in a case that first comparison result indicates that the first deflection degree variation is less than or equal to the backlash filtering coefficient, an updated deflection value at the target inflection point as updated deflection values used for representing processing on a plurality of video frames

FIG. 8

VIDEO FRAME PROCESSING METHOD AND APPARATUS, COMPUTER DEVICE, AND STORAGE MEDIUM

CROSS-REFERENCE TO RELATED APPLICATIONS

This application is a continuation application of International Application No. PCT/CN2023/099877 filed on Jun. 13, 2013, which claims priority to Chinese Patent Application No. 202210980758.0, filed with the China National Intellectual Property Administration on Aug. 16, 2022, the disclosures of each being incorporated by reference herein in their entireties.

FIELD

The disclosure relates to the field of video processing technologies, and in particular, to a video frame processing method and apparatus, a computer device, a storage medium, and a computer program product.

BACKGROUND

With development of video technologies and Internet technologies, a large quantity of users can perform a video conference, or view various videos (such as live videos) through an intelligent terminal conveniently. Because noise is inevitably introduced during video acquisition, video jitter may occur during a video conference or video viewing, resulting in video distortion. When video frames in a video are processed, the video distortion may affect stability of the processed video frames.

SUMMARY

According to some embodiments, a video frame processing method and apparatus, a computer device, a non-transitory computer-readable storage medium, and a computer program product are provided.

Some embodiments provide a video frame processing method, performed by a computer device, the method including: receiving a plurality of video frames carrying noise, wherein the plurality of video frames include an object; extracting a plurality of poses of a part of the object; determining a plurality of deflection degree values of the part based on the plurality of poses; generating a control signal based on the plurality of deflection degree values; obtaining a plurality of updated deflection values based on backlash filtering of the control signal; and performing image processing on the plurality of video frames based on the plurality of updated deflection values.

The extracting the plurality of poses may include: extracting a plurality of points of the object; and extracting the plurality of poses based on the plurality of points.

The generating the control signal may include: obtaining a plurality of time sequence identifiers of the plurality of video frames; and generating the control signal based on the plurality of time sequence identifiers and the plurality of deflection degree values, wherein the control signal describes a change of the plurality of deflection degree values over time.

The plurality of video frames may be obtained in real-time, the control signal may describe a change of the plurality of deflection degree values over time, and the obtaining the plurality of updated deflection values may include: determining a first deflection degree variation based on a target inflection point, based on a plurality of incrementing deflection degree values of the plurality of deflection degree values incrementing over time; obtaining a first comparison result based on the first deflection degree variation and a backlash filtering coefficient; and determining the plurality of updated deflection values based on an updated deflection value at the target inflection point, based on the first deflection degree variation being less than or equal to the backlash filtering coefficient in the first comparison result.

Some embodiments may further include: obtaining a sum value based on a summation of the backlash filtering coefficient and a preset parameter; obtaining a second comparison result based on the first deflection degree variation and the sum value, based on the first deflection degree variation being greater than the backlash filtering coefficient in the first comparison result; and obtaining the plurality of updated deflection values based on a linear transformation of the plurality of incrementing deflection degree values, based on the first deflection degree variation being less than or equal to the sum value in the second comparison result.

Some embodiments may further include obtaining the plurality of updated deflection values based on the first deflection degree variation being equal to the sum value, based on the first deflection degree variation being greater than the sum value in the second comparison result.

Some embodiments may further include: determining a second deflection degree variation based on a plurality of decrementing deflection degree values of the plurality of deflection degree values decrementing over time; and determining the plurality of updated deflection values based on a new updated deflection value at a new target inflection point, based on the second deflection degree variation being less than the backlash filtering coefficient, wherein the new target inflection point is formed after the target inflection point.

The plurality of video frames may be obtained in real-time, the control signal may describe a change of the plurality of deflection degree values over time, and the obtaining the plurality of updated deflection values may include: determining a first deflection degree variation based on a target inflection point, based on a plurality of decrementing deflection degree values of the plurality of deflection degree values decrementing over time; obtaining a third comparison result based on the first deflection degree variation and a backlash filtering coefficient; and determining the plurality of updated deflection values based on an updated deflection value at the target inflection point, based on the first deflection degree variation being less than or equal to the backlash filtering coefficient in the third comparison result.

Some embodiments may further include: obtaining a sum value based on a summation of the backlash filtering coefficient and a preset parameter; obtaining a fourth comparison result based on the first deflection degree variation and the sum value, based on the first deflection degree variation being greater than the backlash filtering coefficient in the third comparison result; and obtaining the plurality of updated deflection values based on a linear transformation of the plurality of decrementing deflection degree values, based on the first deflection degree variation being less than or equal to the sum value in the fourth comparison result.

Some embodiments may further include obtaining the plurality of updated deflection values based on the first deflection degree variation being equal to the sum value, based on the first deflection degree variation being greater than the sum value in the fourth comparison result.

Some embodiments may further include: determining a second deflection degree variation based on a plurality of incrementing deflection degree values of the plurality of deflection degree values incrementing over time; and determining the plurality of updated deflection values based on a new updated deflection value at a new target inflection point, based on the second deflection degree variation being less than the backlash filtering coefficient, wherein the new target inflection point is formed after the target inflection point.

The part may include a face, the plurality of poses may include a plurality of pitch angles, a plurality of yaw angles, and a plurality of roll angles, and the determining the plurality of deflection degree values may include: obtaining a normalized pitch angle based on normalization of the plurality of pitch angles; obtaining a normalized yaw angle based on normalization of the plurality of yaw angles; obtaining a normalized roll angle based on normalization of the plurality of roll angles; determining a product value based on the normalized pitch angle, the normalized yaw angle, and the normalized roll angle; and determining the plurality of deflection degree values based on the product value.

The extracting the plurality of poses may be based on an eye contact state of an application being a first value, wherein the application is configured to play the plurality of video frames.

The performing the image processing may include: obtaining a plurality of positions of an original eye feature point of the plurality of video frames; obtaining a target eye feature point based on the plurality of updated deflection values; and replacing the original eye feature point by fusing the target eye feature point into the plurality of video frames based on the plurality of positions.

The part may include a hand, and the performing the image processing may include: obtaining special effect data based on the plurality of updated deflection values satisfying a special effect adding condition; and adding the special effect data to the plurality of video frames.

Some embodiments provide a video frame processing apparatus, including: at least one memory configured to store computer program code; at least one processor configured to read the program code and operate as instructed by the program code, the program code including: video frame receiving code configured to cause at least one of the at least one processor to receive a plurality of video frames carrying noise, wherein the plurality of video frames include an object; pose determining code configured to cause at least one of the at least one processor to extract a plurality of poses of a part of the object; deflection degree value determining code configured to cause at least one of the at least one processor to determine a plurality of deflection degree values of the part based on the plurality of poses; control signal determining code configured to cause at least one of the at least one processor to generate a control signal based on the plurality of deflection degree values; deflection degree value updating code configured to cause at least one of the at least one processor to obtain a plurality of updated deflection values based on backlash filtering of the control signal; and image processing code configured to cause at least one of the at least one processor to perform image processing on the plurality of video frames based on the plurality of updated deflection values.

Some embodiments provide a non-transitory computer-readable storage medium, storing computer code which, when executed by at least one processor, causes the at least one processor to at least: receive a plurality of video frames carrying noise, wherein the plurality of video frames include an object; extract a plurality poses of a part of the object; determine a plurality of deflection degree values of the part based on the plurality of poses; generate a control signal based on the plurality of deflection degree values; obtain a plurality of updated deflection values based on backlash filtering of the control signal; and perform image processing on the plurality of video frames based on the plurality of updated deflection values.

Details of some embodiments are provided in the accompanying drawings and descriptions below. Other features, objectives, and advantages become apparent from the specification, the drawings, and the claims.

BRIEF DESCRIPTION OF THE DRAWINGS

To describe the technical solutions in some embodiments more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 2 is a schematic flowchart of a video frame processing method according to some embodiments.

FIG. 8 is a schematic flowchart of calculating an updated deflection value according to some embodiments.

DESCRIPTION OF EMBODIMENTS

Figure 1:
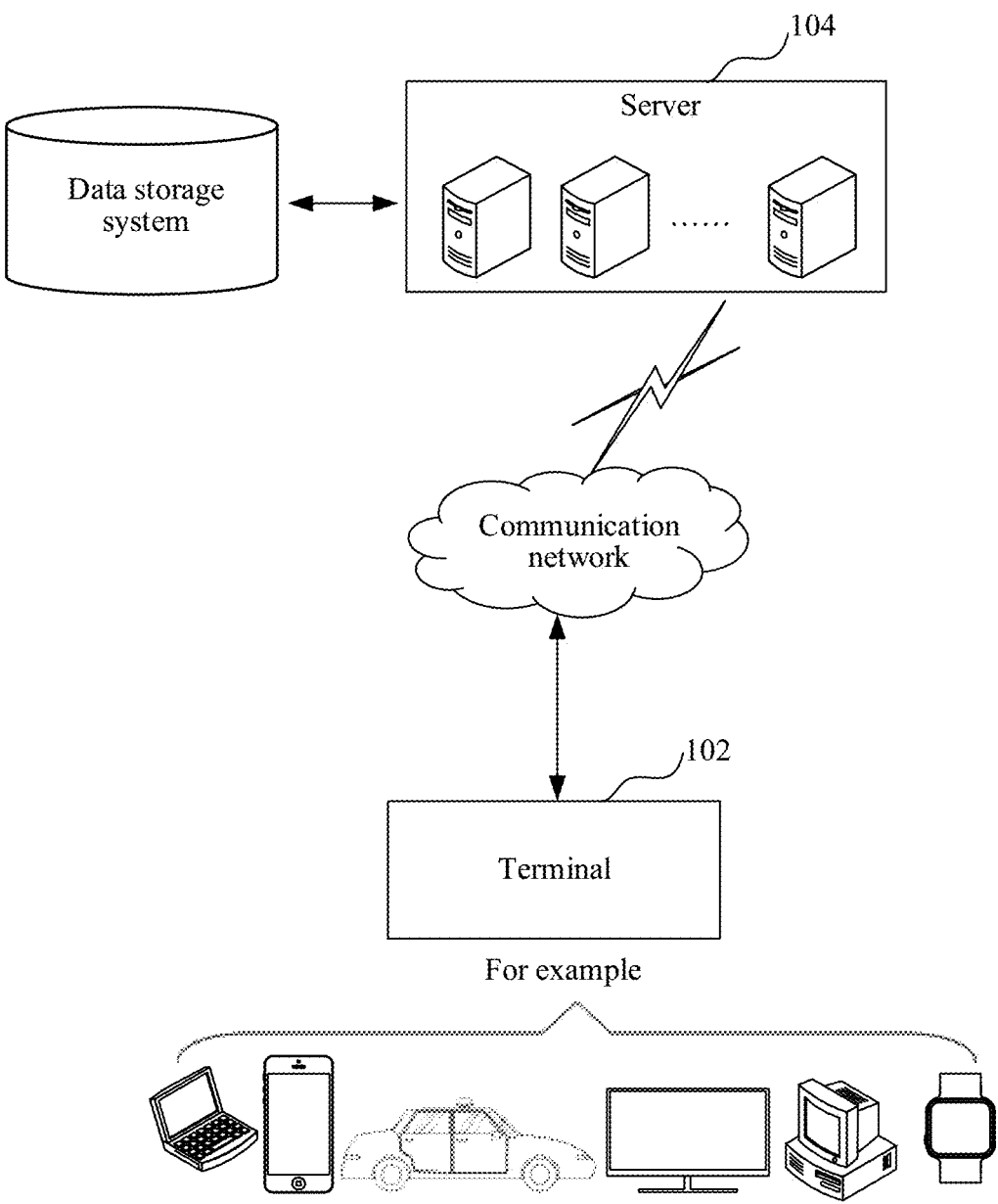
FIG. 1 is a diagram of an application environment of a video frame processing method according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

In the specification and accompanying drawings, substantially the same or similar operations and elements are represented by the same or similar reference numerals, and repeated descriptions of these operations and elements will be omitted. In addition, terms "first," "second," and the like are used for distinguishing between the descriptions, and cannot be understood as indicating or implying relative importance or an order.

A video frame processing method provided in some embodiments may be applied to an application environment shown in FIG. 1. A terminal 102 communicates with a server 104 via a network. A data storage system may store data that to be processed by the server 104. The data storage system may be integrated on the server 104, or may be provided on a cloud or another network server.

In an application scenario, a terminal obtains video frames of an object. The terminal may use a configured camera to obtain the video frames of the object. Alternatively, the terminal may obtain the video frames of the object from a server. The terminal determines poses of a part of the object in the video frames carrying noise. The terminal determines deflection degree values of the part in the video frames according to the poses of the part. The terminal generates a control signal based on the deflection degree values of the part in the video frames. The terminal performs backlash filtering on the control signal by using a backlash filter according to a backlash filtering coefficient to obtain updated deflection values of the part in the video frames. The terminal performs image processing on the video frames according to the updated deflection values in the video frames.

In an application scenario, a terminal obtains video frames including an object in real-time. The terminal sends the video frames to a server, and the video frames received by the server carry noise. The server determines poses of a part of the object presented in the video frames carrying noise. The server determines deflection degree values of the part in the video frames according to the poses of the part. The server generates a control signal based on the deflection degree values of the part in the video frames. The server performs backlash filtering on the control signal according to a backlash filtering coefficient by using a backlash filter to obtain updated deflection values of the part in the video frames. The server performs image processing on the video frames according to the updated deflection values in the video frames.

The terminal 102 may be a smartphone, a tablet computer, a laptop computer, a desktop computer, a smart speaker, a smartwatch, an Internet of Things device and a portable wearable device. The Internet of Things device may be a smart speaker, a smart television, a smart air conditioner, a smart vehicle-mounted device, and the like. The portable wearable device may be a smartwatch, a smart band, a head-mounted device, and the like.

The server 104 may be an independent physical server or a service node in a blockchain system. A peer to peer (P2P) network is formed between each service node in the blockchain system. A P2P protocol is an application layer protocol that runs over a transmission control protocol (TCP).

In addition, the server 104 may be a server cluster formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), and a big data and artificial intelligence platform.

The terminal 102 may be connected to the server 104 in a communication connection manner such as a Bluetooth, a universal serial bus (USB), or a network, which is not limited.

In some embodiments, as shown in FIG. 2, a video frame processing method is provided. The method may be applied to the terminal or the server in FIG. 1. An example in which the method is applied to the terminal in FIG. 1 is used for description. The method includes the following operations:

Operation 202: Receive a plurality of video frames carrying noise, the plurality of video frames including an object.

The object is a moving object in each video frame. For example, the object may be a human being included in the video frame.

In some embodiments, the object may be an object in the video frame. For example, when the video frame includes a human being, the human being is the object, and when the video frame includes at least two human beings, a human being occupying more pictures of the video frame is used as the object.

In some embodiments, the object may be a plurality of objects in the video frame. For example, when the video frame includes a plurality of human beings, the object may be the plurality of human beings.

In some embodiments, the plurality of video frames may be a plurality of video frames that are received by the terminal and that are sent by the server. A third-party device may shoot the plurality of video frames and encode the plurality of video frames to obtain a bitstream corresponding to the plurality of video frames. The third-party device sends the bitstream to the server, and the server sends the bitstream to the terminal. The terminal receives the bitstream, and decode the bitstream to obtain the plurality of video frames. The plurality of video frames may further be shot by a configured camera of the terminal.

Noise may be introduced during shooting of the plurality of video frames, and may also be introduced during encoding and decoding of the plurality of video frames. Therefore, the video frames received by the terminal carry noise. The noise carried by the plurality of video frames may be different.

Operation 204: Extract poses of a part of the object in the plurality of video frames.

When the object is a human being, the part of the object may be a body part of the human being. For example, the part of the object may be but is not limited to a face and a hand.

Each pose may be used for representing an orientation of the part in a video frame or a posture of the part in the video frame. For example, when the body part is a face, the pose may be used for representing an orientation of the face in the video frame, and when the body part is a hand, the pose may be used for representing a posture of the hand in the video frame.

In some embodiments, the terminal extracting the poses of the part of the object in the plurality of video frames may be extracting pose parameter values of the part of the object in the plurality of video frames. For example, when the part is a face, a pose parameter value of the face may reflect an orientation of the face in the video frame, and may include a pitch angle, a yaw angle, and a roll angle of the face.

In some embodiments, the terminal extracting the poses of the part in the plurality of video frames may be extracting the poses of the part in the plurality of video frames. For example, the terminal extracts feature points of the part in the plurality of video frames to obtain the poses of the part in the plurality of video frames according to the feature points of the part in the plurality of video frames.

Because the video frames carry the noise, the extracted feature points of the part in the plurality of video frames are affected by the noise. For example, positions of the extracted feature points of the part are inaccurate, and consequently, the poses obtained according to the feature points of the part are also affected by the noise, resulting in inaccurate extracted poses of the part. Louder noise lead to a larger difference between the extracted pose of the part and actual poses of the part. Because the video frames carry the noise, when the part remains stationary in the video frames, the poses of the part extracted by the terminal may be different in the video frames.

Operation 206: Determine deflection degree values of the part in the plurality of video frames according to the poses of the part.

Each deflection degree value is used for representing a difference between the pose and a reference pose. The deflection degree value of the part in the video frame is used for representing a deviation degree of the pose of the part in the video frame relative to the reference pose.

For example, a target part is a face. A deflection degree value of the face in the video frame is used for representing a difference between an orientation of the face in the video frame (represented by a pose of the face) and a reference orientation (represented by a reference pose of the face). A greater deflection degree value indicates a larger difference between the orientation of the face and the reference orientation. A less deflection degree value indicates a smaller difference between the orientation of the face and the reference orientation.

The reference orientation may be an orientation of the face directly facing a display screen of the terminal. In this case, the deflection degree value may be used for representing a deviation degree the orientation of the face relative to the orientation of the face directly facing the display screen of the terminal. A less deflection degree value indicates that the orientation of the face is closer to the orientation of the face directly facing the display screen.

For example, the target part is a hand. A deflection degree value of the hand in the video frame is used for representing a difference between a posture of the hand in the video frame (represented by a pose of the hand) and a reference posture (represented by a reference pose of the hand). A greater deflection degree value indicates a larger difference between the posture of the hand and the reference posture. A less deflection degree value indicates a smaller difference between the posture of the hand and the reference posture.

The reference posture includes but is limited to: a reference posture representing "yeah" (in which after the hand clenches a fist, a palm faces the display screen, and an index finger and a middle finger extend upward), a reference posture representing "OK" (in which palm opens, a thumb and the index finger bends toward the display screen, and the thumb and the index finger bend to form a circle), and a reference posture representing "1" (in which after the hand clenches a fist, the palm faces the display screen, and the index finger extend upward). In this way, the deflection degree value may be used for representing the difference between the hand posture and the reference posture. For example, the posture of the hand is the posture representing "yeah", but the index finger and middle finger are not straightened, resulting in a difference between the hand posture and the reference posture representing "yeah".

In some embodiments, for each video frame, the terminal determines a difference between the extracted pose of the part in the video frame and the reference pose to obtain a deflection degree value of the part in the video frame. A magnitude of the deflection degree value may reflect a pose change of the part. For example, the part is a face. When orientations of the face are different in the video frames, the deflection degree values of the part in the video frames are different.

Because the extracted pose of the part cannot accurately reflect an actual pose of the part under an impact of the noise, the deflection degree value cannot accurately reflect an actual difference between the actual pose of the part and the reference pose. Based on the actual pose of the part deflecting, because the extracted pose of the part is affected by the noise, the deflection degree value is generated under joint impacts of the deflection of the actual pose and the noise. Based on the actual pose of the part not deflecting, because the extracted pose of the part is affected by the noise, the deflection degree value is generated under the impact of the noise.

Operation 208: Generate a control signal based on the deflection degree values.

The video frames have a time sequence. In this case, the video frames may be regarded as a video frame sequence having the time sequence. The control signal is a time-continuous signal generated based on the deflection degree values, and may be used for reflecting a changing trend of the deflection degree values of the target part in the video frames.

The control signal may be used for controlling to perform image processing on the video frame. Further, the control signal may be used for controlling whether to perform image processing on the video frame. For example, the control signal may be used for controlling whether to display a special effect in the video frame, or may be used for controlling whether to perform eye feature point adjustment on the object in the video frame.

For example, a video frame f0 and a video frame f1 correspond to time t0 and time t1 (for example, obtaining time) respectively. In this case, a control signal at the time t0 may represent a deflection degree value or an encoding value of a deflection degree value of the part in the video frame f0. A control signal at the time t1 may represents a deflection degree value or an encoding value of a deflection degree value of the part in the video frame f1.

In some embodiments, the control signal is generated according to the time sequence of the video frames and the deflection degree values of the part in the video frames.

For example, the video frames include the following from front to back in the time sequence: a video frame f1, a video frame f2, a video frame f3, a video frame f4, and a video frame f5. A deflection degree value of the video frame f1 is p1, a deflection degree value of the video frame f2 is p2, a deflection degree value of the video frame f3 is p3, a deflection degree value of the video frame f4 is p4, and a deflection degree value of the video frame f5 is p5. By using a point depiction method, a smooth curve is drawn based on the video frames and corresponding deflection degree values to obtain a visualization signal curve of the control signal. A horizontal coordinate of the visualization signal curve represents the time, and a vertical coordinate represents the deflection degree value.

Figure 3:
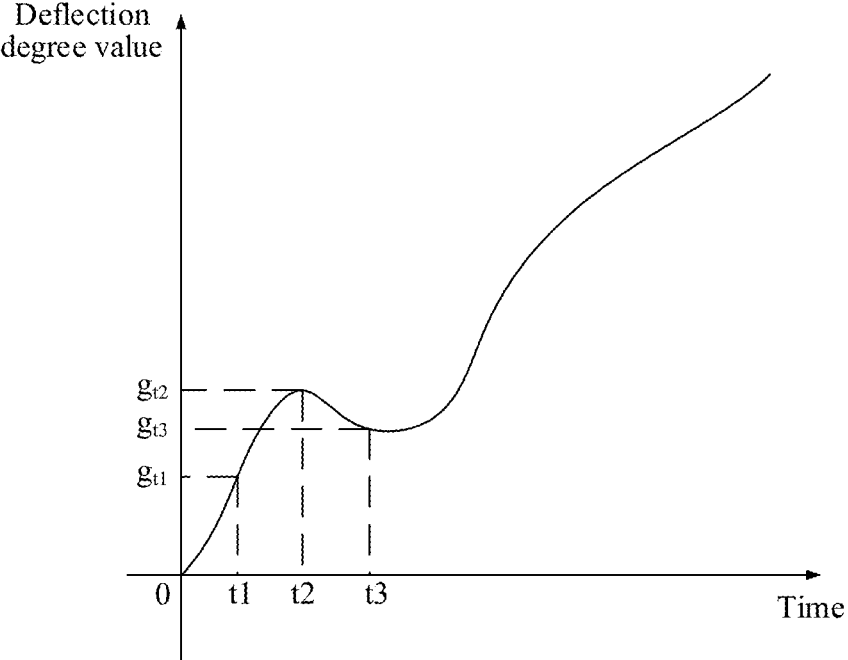
FIG. 3 is a schematic diagram of a visualization signal curve of a control signal according to some embodiments.

For example, the visualization signal curve of the control signal is shown as shown in FIG. 3. $g_{r1}$ is a deflection degree value of the face in a video frame t1, $g_{r2}$ is a deflection degree value of the face in a video frame t2, $g_{r3}$ is a deflection degree value of the face in a video frame t3. It can be learned that a playing time sequence of the video frame t1 is earlier than a playing time sequence of the video frame t2, and the playing time sequence of the video frame t2 is earlier than a playing time sequence of the video frame t3. $g_{r1}$ is less than $g_{r2}$, and $g_{r2}$ is greater than $g_{r3}$. Therefore, it can be learned that a trend of the deflection degree values change over playback time is an increment trend between the video frame t1 and the video frame t2, and a trend of the deflection degree values change over the playback time is a decrement trend between the video frame t2 and the video frame t3. The visualization signal curve of the control signal shown in FIG. 3 is an example. The visualization signal curve of the control signal may be in another form.

Operation 210: Perform backlash filtering on the control signal to obtain updated deflection values used for representing processing on the plurality of video frames.

A backlash is a gap formed when two workpieces are engaged. A backlash phenomenon indicates a backlash formed when two workpieces are engaged leads to a case that a return corresponding to the backlash when a workpiece switches an operating state may be run to drive the other workpiece to switch an operating state. For example, a backlash exists when two gears are engaged. When a primary gear operates clockwise, a secondary gear engaged with the primary gear operates counterclockwise. When the primary gear switches to operates counterclockwise, the primary gear may complete a return corresponding to the backlash first when operating counterclockwise before the secondary gear is driven to switch to operate clockwise.

The backlash filtering is a filtering manner obtained according to the foregoing backlash phenomenon, and is used for filtering out a changing process of the deflection degree values in the control signal caused by noise and obtaining the updated deflection values according to the deflection degree values in which the noise is filtered out.

The updated deflection value is used for reflecting a degree of the image processing performed on the video frame. The degree of the image processing performed on the video frame may be a state of performing the image processing on the video frame or not performing the image processing on the video frame.

In some embodiments, performing the backlash filtering on the control signal may be performing the backlash filtering on the control signal according to a backlash filtering coefficient, and the backlash filtering coefficient is used for reflecting a change threshold of the deflection degree values.

In some embodiments, the backlash filtering coefficient may be determined based on a deflection degree value generated by an actual change of the pose of the part. The deflection degree value generated by an actual change of the pose is different from the deflection degree value generated by the noise. For example, the part is a face. A change of a pose of the face may be a change of an orientation of the face. A deflection degree value generated when the orientation of the face changes by a preset angle may be set as the backlash filtering coefficient. The preset angle may be any one of a pitch angle, a yaw angle, or a roll angle. The preset angle may be set to 10 degrees or 15 degrees, for example.

The backlash filtering coefficient corresponds to the return corresponding to the backlash in the foregoing backlash phenomenon. The control signal is analogous to an operating state of the primary gear, and the updated deflection value is analogous to an operating state of the secondary gear. When a trend of increasing and decreasing of the deflection degree values in the control signal changes and variations of the deflection degree values are not greater than the change threshold, the primary gear completes the return corresponding to the backlash after the primary gear switches a rotation direction. When the trend of increasing and decreasing of the deflection degree values in the control signal changes and the variations of the deflection degree values are greater than the change threshold, the primary gear completes the return corresponding to the backlash after the primary gear switches the rotation direction.

For example, an increment trend of the deflection degree values in the control signal is analogous to the primary gear operating clockwise and the secondary gear operating counterclockwise. For example, the deflection degree values in the control signal change from the increment trend to a decrement trend is analogous to the primary gear operating counterclockwise. After the deflection degree values change from the increment trend to the decrement trend and when the variations of the deflection degree values do not exceed the backlash filtering coefficient, it is analogous to that the primary gear does complete the return of the backlash is after the primary gear switches to operate counterclockwise. In this case, the operating state of the secondary gear is not switched. After the deflection degree values change from the increment trend to the decrement trend and when the variations of the deflection degree values exceed the backlash filtering coefficient, it is analogous to that the primary gear complete the return of the backlash after the primary gear switches to operate counterclockwise. In this case, operating state of the secondary gear is switched. The primary gear and the secondary gear may also be referred to as a driving gear and a driven gear.

After the trend of increasing and decreasing of the deflection degree values changes for the first time (for example, after the deflection degree values change from the increment trend to the decrement trend), and based on the variations of the deflection degree values not being greater than the backlash filtering coefficient, the deflection degree values may change from the increment trend to the decrement trend until the deflection degree value is the same as a deflection degree value when the trend of increasing and decreasing changes for the first time. During the changing process of the deflection degree values, the variations of the deflection degree values may not be greater than the backlash filtering coefficient, the changing process is filtered out according to the backlash filtering, and updated deflection values are determined after the filtering. The updated deflection values corresponding to the deflection degree values in the changing process are the same as an updated deflection value corresponding to the deflection degree value when the trend of increasing and decreasing changes for the first time. In this case, the changing process of the deflection degree values is caused by the noise. The changing process of the deflection degree values leads to jitter of the control signal. The jitter of the control signal caused by the noise is filtered out according to the backlash filtering.

After the trend of increasing and decreasing of the deflection degree value changes, and based on the variations of the deflection degree values being greater than the backlash filtering coefficient, the deflection degree values continue to change according to the trend after changing, and the variations of the deflection degree values may be greater than the backlash filtering coefficient during the changing of the deflection degree values. In the changing process, a former part of the process in which the variations of the deflection degree values are not greater than the backlash filtering coefficient is filtered out according to the backlash filtering, and updated deflection values of the former part of the process are determined after the filtering. The updated deflection values corresponding to the deflection degree values of the former part of the process are the same as updated deflection values corresponding to the deflection degree values when the trend of increasing and decreasing changes. A latter part of the process in which the variations of the deflection degree values are greater than the backlash filtering coefficient is not filtered out according to the backlash filtering, and updated deflection values are determined according to the deflection degree values of the latter part of the process. In this case, the changing process of the deflection degree values is caused by changes of the poses of the part.

In some embodiments, after using the deflection degree value generated by the actual change of the pose of the part as the backlash filtering coefficient, the terminal may generate a backlash filter according to the foregoing backlash phenomenon, and use the backlash filtering coefficient as a filtering parameter of the backlash filter. The terminal may perform the backlash filtering on the control signal by using the backlash filter to filter out the jitter caused by the noise, and output the updated deflection values according to the control signal in which the jitter caused by the noise.

Operation 212: Perform image processing on the plurality of video frames in sequence based on the updated deflection values.

In some embodiments, the updated deflection value of the video frame may be used for reflecting whether to perform image processing on the video frame. For example, when the updated deflection value of the video frame is a first updated value, the image processing is performed on the video frame, and when the updated deflection value of the video frame is a second updated value, the image processing is not performed on the video frame.

Correspondingly, performing image processing on the video frame may be processing feature points of the part in the video frame. For example, when the part is a face, eye feature points in the face may be adjusted. In this example, the updated deflection value of the video frame may be used for reflecting whether to adjust the eye feature points. The performing image processing on the video frames may be adding a special effect into the video frame. For example, a special effect of fireworks may be added into the video frame. In this example, the updated deflection value of the video frame may be used for reflecting whether to add the special effect of fireworks into the video frame.

In some embodiments, the updated deflection value of the video frame may be used for reflecting a degree of performing image processing on the video frame. For example, a greater updated deflection value of the video frame indicates a higher degree of performing image processing on the video frame, and a less updated deflection value of the video frame indicates a lower degree of performing image processing on the video frame.

Correspondingly, performing image processing on the video frames may be adjusting an image parameter of the video frame. A greater updated deflection value of the video frame indicates a greater difference between the video frame after the image parameter is adjusted and the video frame before the image parameter is adjusted, and a less updated deflection value of the video frame indicates a smaller difference between the video frame after the image parameter is adjusted and the video frame before the image parameter is adjusted. For example, during performing the image processing on the video frame, filter processing may be performed on the video frame by adjusting the image parameter of the video frame.

In some embodiments, for each video frame, an image processing state corresponding to the updated deflection value of the video frame is obtained, and the video frame is processed according to the image processing state to obtain a video frame after the image processing.

According to the foregoing video frame processing method, a plurality of video frames carrying noise are received. Poses of a part of an object in the video frames are extracted. Deflection degree values of the part in the plurality of video frames are determined according to the poses of the part. A control signal is generated according to the deflection degree values. Backlash filtering is performed on the control signal to obtain updated deflection values used for representing processing on the plurality of video frames. Then, image processing is performed on the plurality of video frames in sequence based on the updated deflection values. Because the video frames carry noise, and the poses of the part are affected by the noise, the deflection degree values of the part are also affected by the noise, resulting in jitter on the control signal caused by the noise, and the updated deflection value are also affected by the noise, and consequently, jitter is generated when the image processing is performed on the video frame, for example, frequent switching between performing image processing on the video frame and not performing image processing on the video frame. According to the foregoing video frame processing method, the backlash filtering is performed on the control signal to filter out the jitter on the control signal caused by the noise and obtain the updated deflection values of the video frames. An impact of the noise on the updated deflection values is filtered out by the backlash filtering, and the jitter caused by the noise during performing the image processing on the video frame is also eliminated, so that stability of the video frame after the image processing is improved.

In some embodiments, the extracting poses of a part of the object in the plurality of video frames includes: extracting points of the object from the plurality of video frames; and extracting the poses of the part of the object in the plurality of video frames based on the points.

The points of the object are feature points of the part of the object. For example, the part is a face. The points of the object include but are not limited to a pixel point corresponding to an eye corner, a pixel point corresponding to a pupil, a pixel point corresponding to a mouth corner, and the like. For example, the part is a hand. The points of the object include but are not limited to a pixel point corresponding to a finger joint.

In some embodiments, the terminal obtains the plurality of video frames obtained in real-time and carrying noise, and performs point extraction on the plurality of video frames to obtain the points of the object in the plurality of video frames. The terminal determines the poses of the part of the object in the plurality of video frames according to the points of the object in the plurality of video frames. The extracting the points of the object and the determining the poses of a target part in the video frames based on the points may all be implemented by existing manners. Specific processes of the extracting the points of the object and the determining the poses of the part of the object in the video frames based on the points are not limited.

Figure 4:
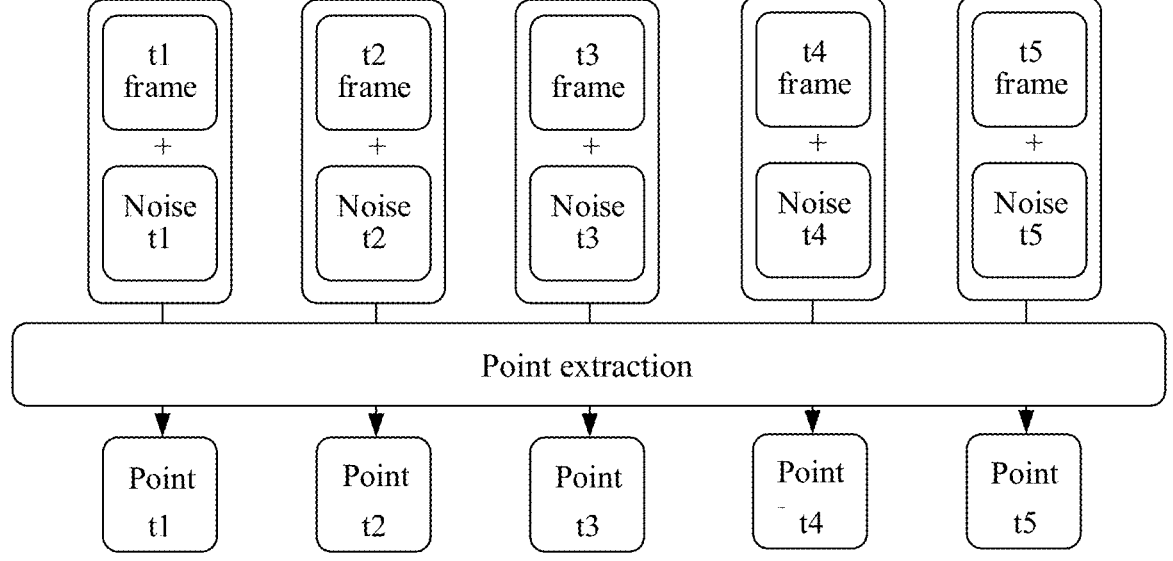
FIG. 4 is a schematic diagram of points in a video frame according to some embodiments.

For example, as shown in FIG. 4, the plurality of video frames obtained by the terminal are: a t1 frame, a t2 frame, a t3 frame, a t4 frame, and a t5 frame. Noise carried by the t1 frame is noise t1, noise carried by the t2 frame is noise t2, noise carried by the t3 frame is noise t3, noise carried by the t4 frame is noise t4, and noise carried by the t5 frame is noise t5. The terminal performs point extraction on the t1 frame, the t2 frame, the t3 frame, the t4 frame, and the t5 frame that carry the noise, to obtain a point t1 corresponding to the t1 frame, a point t2 corresponding to the t2 frame, a point t3 corresponding to the t3 frame, a point t4 corresponding to the t4 frame, and a point t5 corresponding to the t5 frame. The terminal performs pose estimation on the points of the t1 frame, the t2 frame, the t3 frame, the t4 frame, and the t5 frame to obtain poses of the part in the t1 frame, the t2 frame, the t3 frame, the t4 frame, and the t5 frame.

Figure 5:
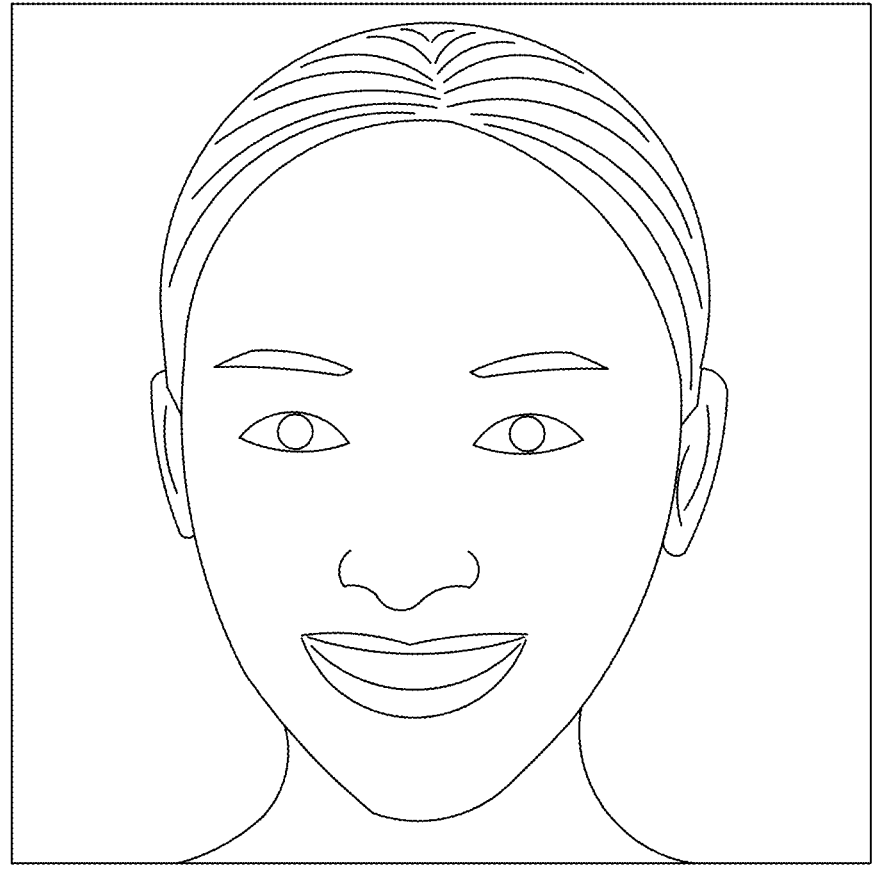
FIG. 5 is a schematic diagram of a video frame according to some embodiments.
Figure 6:
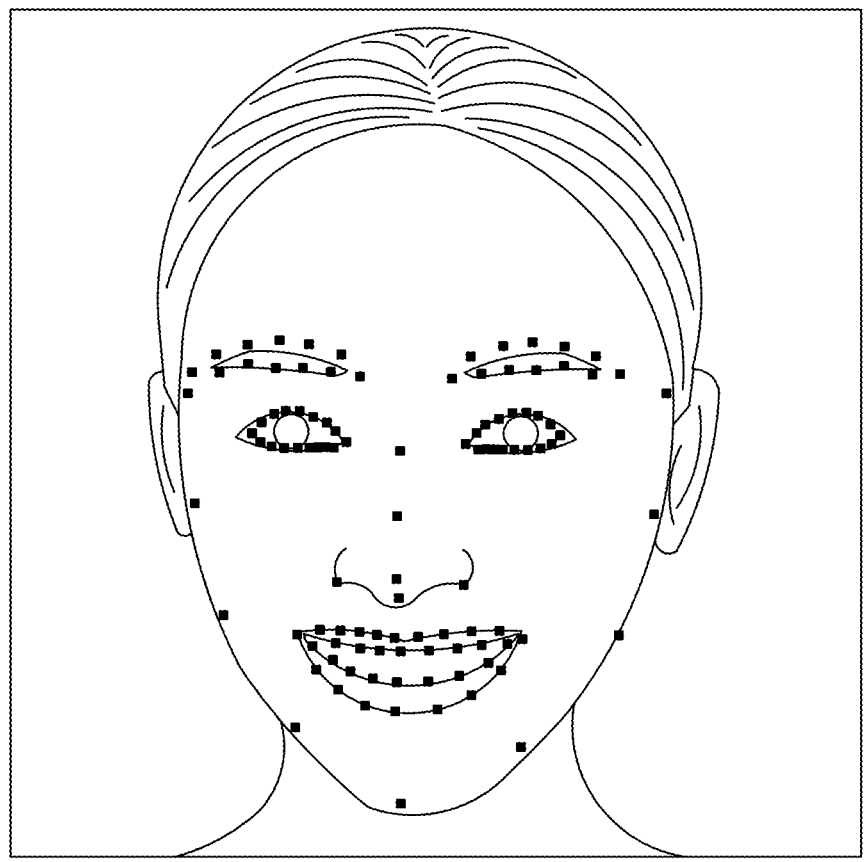
FIG. 6 is a schematic diagram of extracting points from a video frame according to some embodiments.
Figure 7:
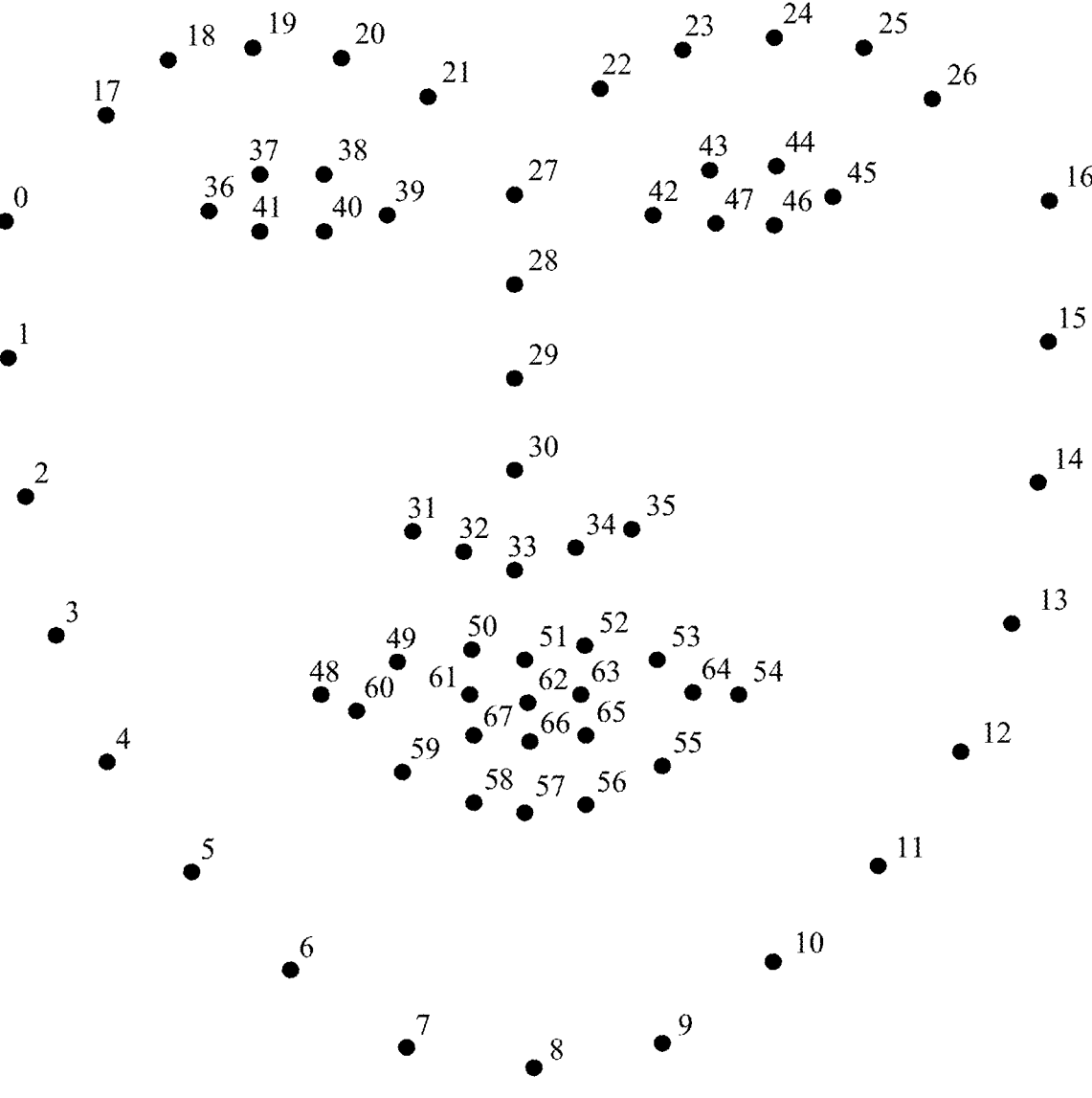
FIG. 7 is a schematic diagram of points according to some embodiments.

In some embodiments, the part of the object is a face. For each video frame obtained by the terminal, after obtaining the video frame, the terminal detects points (feature points of the face) of the object in the video frame. For example, a video frame is shown in FIG. 5. The feature points of the face of the detected object in the video frame are shown in FIG. 6, and the feature points of the face of the object are obtained by extracting, as shown in FIG. 7. A pose of the face in the video frame is extracted according to the feature points of the face of the object.

In some embodiments, the part of the object is a hand. For each video frame obtained by the terminal, after obtaining the video frame, the terminal detects points (feature points of the hand) of the object in the video frame, extracts the feature points of the hand, and determines a pose of the hand in the video frame according to the feature points of the hand.

In some embodiments, the terminal extracting the points of the object in the video frame carrying noise is extracting the feature points of the part, and extracting the pose of the part in the video frame based on the feature points of the part, so that the extracted pose of the part is more accurate, to facilitate subsequent extraction of the deflection degree value of the part in the video frame based on the pose of the part in the video frame.

In some embodiments, the plurality of video frames are video frames obtained in real-time, and the control signal is used for describing a trend of the deflection degree values changing over time. In this case, as shown in FIG. 8, 208 may include:

Operation 802: Determine a first deflection degree variation relative to a target inflection point in a process in which the deflection degree values in the control signal begin to increment over time.

Figure 9:
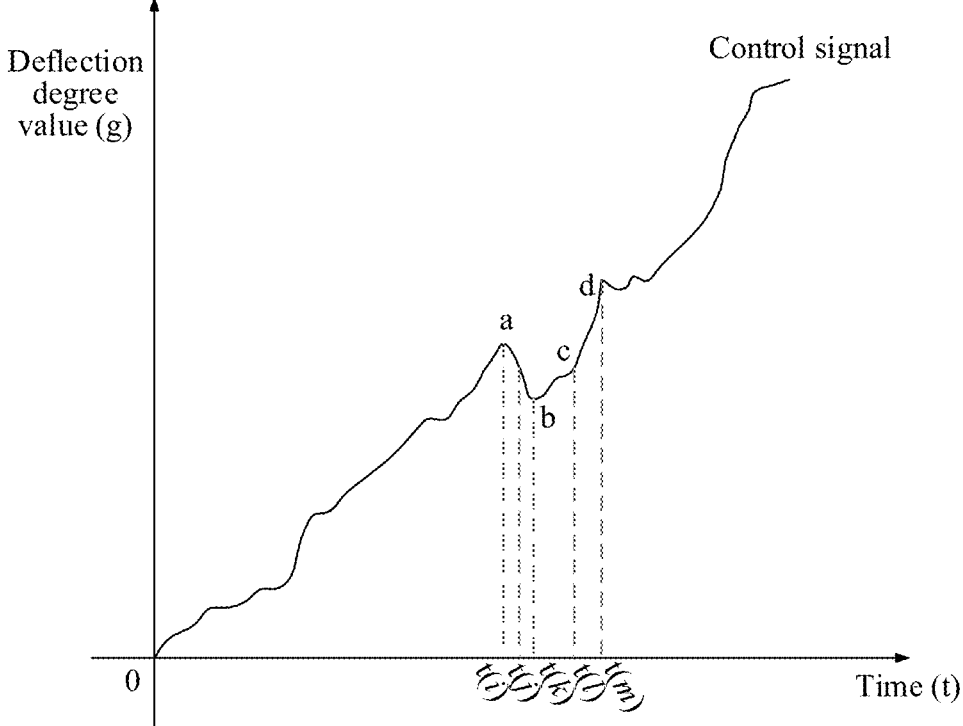
FIG. 9 is a schematic diagram of a visualization signal curve of a control signal according to some embodiments.

The target inflection point is a point in the control signal. In the process in which the deflection degree values in the control signal begin to increment over time, the target inflection point may be a point at which the deflection degree values change from decrementing to incrementing (such as a valley point in the control signal). For example, a point b shown in FIG. 9 is a target inflection point.

The first deflection degree variation is used for representing a difference between a deflection degree value at the target inflection point and a deflection degree value of current time (that is, a current moment). The deflection degree values change over time, and the corresponding first deflection degree variation also changes over time. For example, when the deflection degree values increment over time, the corresponding first deflection degree variation also increments over time.

In some embodiments, operation 802 may include: using, after the deflection degree values in the control signal change from decrementing to incrementing, a deflection degree of the target inflection point as a base value to calculate the first deflection degree variation to obtain the first deflection degree variation relative to the target inflection point. The target inflection point is a point at which the deflection degree values change from decrementing to incrementing, such as the point b in FIG. 9.

In some embodiments, when the control signal is a signal obtained based on originally obtained video frames, in the process in which the deflection degree values in the control signal begin to increment over time, a deflection degree value of a target part in the first frame is used as a base value to calculate the first deflection degree variation. As shown in FIG. 9, a deflection degree value corresponding to a video frame (that is, the first frame) obtained at a 0 moment is used as a base value to calculate differences between deflection degree values corresponding to a plurality of video frames obtained after the 0 moment and the base value, and the differences are used as the first deflection degree variations corresponding to the plurality of video frames from the 0 moment to a t(i) moment. After obtaining the first deflection degree variations, the terminal may perform linear transformation on the obtained deflection degree values to obtain the updated deflection values of the part in the plurality of video frames, such as updated deflection values of the part in the plurality of video frames from the 0 moment to the t(i) moment.

Operation 804: Compare the first deflection degree variation with a backlash filtering coefficient to obtain a first comparison result.

In some embodiments, the terminal may compare the first deflection degree variation with the backlash filtering coefficient to obtain the first comparison result.

Figure 10:
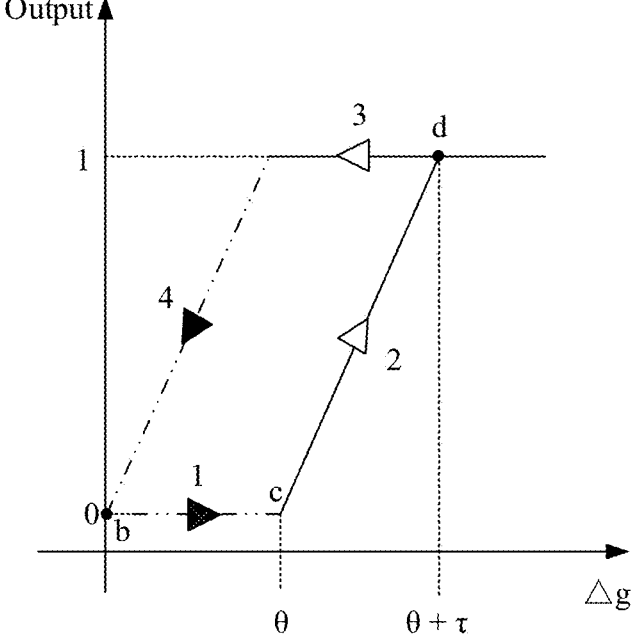
FIG. 10 is a schematic diagram of conversion between deflection degree variation and an updated deflection value according to some embodiments.

For example, as shown in FIG. 10, black points in the figure represent the target inflection points. After the terminal begins to calculate the first deflection degree variation in real-time from the target inflection point b, magnitudes of the first deflection degree variation and the backlash filtering coefficient are compared. When the first deflection degree variation does not reach a point c, that is, the deflection degree value does not reach a t(l) moment as shown in FIG. 9, the first deflection degree variation $\Delta g = |g(t(k)) - g(t(l'))|$ at the moment is less than the backlash filtering coefficient $\theta$. When the first deflection degree variation reaches the point c, the first deflection degree variation $\Delta g = |g(t(k)) - g(t(l))|$ at the moment is equal to the backlash filtering coefficient $\theta$, and $t(l')$ is from $t(k)$ to $t(l)$. When the first deflection degree variation exceeds the point c, the first deflection degree variation is greater than the backlash filtering coefficient $\theta$.

Operation 806: Use, in a case that the first comparison result indicates that the first deflection degree variation is less than or equal to the backlash filtering coefficient, an updated deflection value at the target inflection point as the updated deflection values used for representing processing on the plurality of video frames.

In some embodiments, the terminal obtains the updated deflection value at the target inflection point, and then uses the updated deflection value at the target inflection point as the updated deflection values for processing the plurality of video frames. As shown in FIG. 10, the plurality of video frames in 806 are at least one video frame obtained at time of a stage 1.

In some embodiments, the terminal may process the control signal by using a backlash filter. The backlash filtering coefficient is a filtering parameter of the backlash filter. Specifically, the control signal may be input into the backlash filter. In the process in which the deflection degree values in the control signal begin to increment over time, the backlash filter determines the first deflection degree variation relative to the target inflection point. The backlash filter compares the first deflection degree variation with the backlash filtering coefficient to obtain the first comparison result. In addition, in a case that the first comparison result indicates that the first deflection degree variation is less than or equal to the backlash filtering coefficient, the updated deflection value at the target inflection point is output as the updated deflection values of the plurality of video frames.

In some embodiments, in the process in which the deflection degree values in the control signal begin to increment over time, the first deflection degree variation being less than or equal to the backlash filtering coefficient indicates that changes of the deflection degree values may be caused by the noise, and this corresponds to a case that a primary gear changes a motion state, but does not complete a return corresponding to a backlash, so that a motion state of a secondary gear does not change, that is, the backlash is not eliminated. In this case, the updated deflection values are not adjusted, the updated deflection values are equal to the updated deflection value at the target inflection point, so that an impact on the updated deflection values caused by the noise may be eliminated through the backlash filtering, to avoid miss processing on the video frames caused by the noise.

In some embodiments, the video frame processing method further includes: comparing, in a case that the first comparison result indicates that the first deflection degree variation is greater than the backlash filtering coefficient, the first deflection degree variation with a sum value to obtain a second comparison result, the sum value being obtained by summing the backlash filtering coefficient and a preset parameter; and performing, in a case that the second comparison result indicates that the first deflection degree variation is less than or equal to the sum value, linear transformation on the incremented deflection degree values to obtain the updated deflection values used for representing processing on the plurality of video frames.

In some embodiments, in a case that the deflection degree values in the control signal begin to increment over time, when the first comparison result indicates that the first deflection degree variation is greater than the backlash filtering coefficient, the terminal performs summing on the backlash filtering coefficient and the preset parameter to obtain the sum value. The first deflection degree variation is compared with the sum value to obtain the second comparison result.

For example, as shown in FIG. 10, the terminal begins to calculate the first deflection degree variation in real-time from the target inflection point b. When the first deflection degree variation exceeds the point c but not reaches a point d, for example, reaches a d' (a point between c and d) point, a first deflection degree variation $\Delta g=|g(t(k))-g(t(l))|$ of a moment corresponding to the point d' is compared with the sum value. Apparently, $\Delta g$ at the moment is less than the sum value, that is, $\Delta g<\theta+\tau$. t(m') is the moment corresponding to d', and t(l') is from t(k) to t(l). When the first deflection degree variation exceeds the point d, a first deflection degree variation $\Delta g=|g(t(k))-g(t(l))|$ of a t(m) moment corresponding to the point d is compared with the sum value. Apparently, $\Delta g$ at the moment is equal to the sum value, that is, $\Delta g=\theta+\tau$. The sum value is $\theta+\tau$.

In a case that the second comparison result indicates that the first deflection degree variation is less than or equal to the sum value, linear transformation is performed on the incremented deflection degree values to obtain the updated deflection values used for representing processing on the plurality of video frames.

The first deflection degree variation is greater than the backlash filtering coefficient, and indicates that changes of the deflection degree values are deflection degree values generated by actual changes of poses. In this case, output updated deflection values are incremented. As shown in FIG. 10, in some embodiments, the plurality of video frames in the "performing linear transformation on the incremented deflection degree values to obtain the updated deflection values of the part in the plurality of video frames" are at least one video frame obtained at time of a stage 2.

In some embodiments, in the process in which the deflection degree values in the control signal begin to increment over time, the first deflection degree variation being greater than the backlash filtering coefficient indicates that changes of the deflection degree values may be caused by changes of the poses of the part, and this corresponds to a case that the primary gear changes the motion state, and completes the return corresponding to the backlash, so that the motion state of the secondary gear changes, that is, the backlash is eliminated. Therefore, in a case that the first deflection degree variation is greater than the backlash filtering coefficient, linear transformation is performed on the incremented deflection degree values to obtain the updated deflection values used for representing processing on the plurality of video frames, to effectively process the video frames.

In some embodiments, the video frame processing method further includes: obtaining, in a case that the second comparison result indicates that the first deflection degree variation is greater than the sum value, updated deflection values in a case that the first deflection degree variation is equal to the sum value; and using the obtained updated deflection values as the updated deflection values used for representing processing on the plurality of video frames.

When the first deflection degree variation increases to the sum value, the output updated deflection values do not increase. Therefore, the terminal obtains the updated deflection value in a case that the first deflection degree variation is equal to the sum value, and uses the obtained updated deflection value as the updated deflection values used for representing processing on the plurality of video frames. Because the video frames are obtained in real-time, in some embodiments, the plurality of video frames in the "using the obtained updated deflection value as the updated deflection values of the part in the plurality of video frames" are at least one video frame obtained at time corresponding to the first deflection degree variation being greater than the sum value.

Descriptions are provided with reference to FIG. 9 and FIG. 10 as follows.

Figure 11:
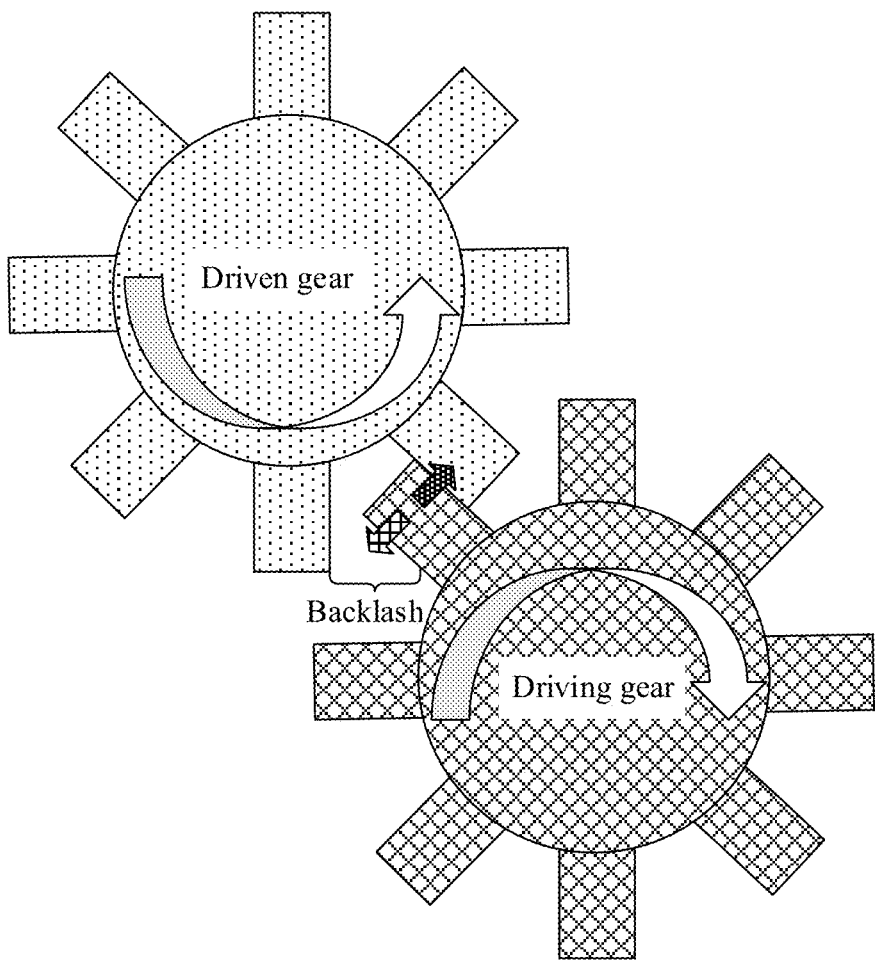
FIG. 11 is a schematic diagram of a backlash phenomenon according to some embodiments.

Refer to FIG. 9. A deflection degree value g changes from decrementing to incrementing starting from the point b. Before the deflection degree value increases to the point c, with reference to FIG. 10, it can be learned that the first deflection degree variation Δg is less than the backlash filtering coefficient θ during a period of time. When the deflection degree value is at the point b, the corresponding first deflection degree variation Δg=0. With the increment of the deflection degree value g, a corresponding first deflection degree variation Δg also increments. When the deflection degree value reaches the point c, the first deflection degree variation Δg=Δg=|g(t(k))–g(t(l))|=the backlash filtering coefficient θ. Because the backlash is not eliminated during a stage (that is, the stage 1 in FIG. 10) from b to c, updated deflection values output by the backlash filter at the stage are equal to the updated deflection value corresponding to the point b. The backlash filtering coefficient θ is equivalent to a backlash that exists when a driving gear switches from rotating clockwise to rotating counterclockwise. As shown in FIG. 11, when the backlash is not eliminated during a driving gear rotates counterclockwise, a driven gear does not switch from rotating counterclockwise to rotating clockwise, that is, the driven gear remains in an original state. Correspondingly, during a stage that the backlash is not eliminated, the updated deflection values output by the backlash filter are equal to the updated deflection value at the moment corresponding to the point b.

During the stage (that is, the stage 2) of c to d, the backlash is eliminated. In this case, the updated deflection values output by the backlash filter during the stage increments. When the deflection degree values reach the point d, the updated deflection values output by the backlash filter reach a maximum value, that is, the updated deflection value is equal to 1.

In some embodiments, when the first deflection degree variation increases to the sum value, the output updated deflection values does not increase continuously. In this case, the updated deflection value when the first deflection degree variation is equal to the sum value is used as the updated deflection value used for representing processing on the plurality of video frames. The video frames are processed according to the updated deflection value corresponding to the sum value, so that the video frames can be effectively processed according to a highest degree of an image processing state.

In some embodiments, after the foregoing operation 806, the method further includes: determining, by the terminal in a case that it is detected that the deflection degree values in the control signal begin to decrement over time, a second deflection degree variation by using a deflection degree value beginning to decrement as a base value; and determining, according to an updated deflection value at a new target inflection point in a case that the second deflection degree variation is less than the backlash filtering coefficient, the updated deflection values used for representing processing on the plurality of video frames. The new target inflection point is an inflection point formed after the target inflection point.

Figure 12:
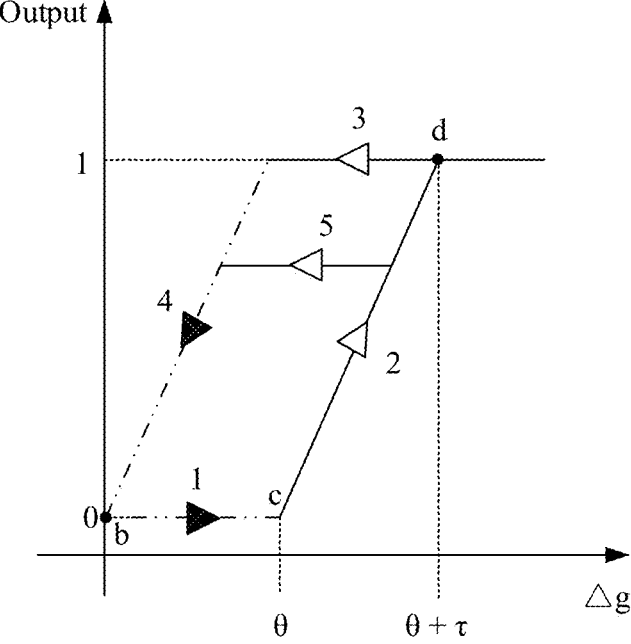
FIG. 12 is a schematic diagram of conversion between deflection degree variation and an updated deflection value according to some embodiments.

For example, when the deflection degree values in the control signal increment during a period of time from t(k) to t(m) and decrement from t(m), as shown in FIG. 9, the process corresponds to a stage 1, a stage 2, and a stage 3 in FIG. 12.

A deflection degree value beginning to decrement (that is, a deflection degree value at the point d) is used as a base value to begin to calculate the second deflection degree variation. Because an amplitude of the decrement in FIG. 9 is small, the second deflection degree variation is also small, that is, less than the backlash filtering coefficient. Afterwards, the deflection degree values in the control signal change to increment. The deflection degree value at the point d is used as a base value to begin to calculate the second deflection degree variation. If an amplitude of the decrement from the point d is large, the second deflection degree variation may change from being less than the backlash filtering coefficient to being greater than the backlash filtering coefficient, and finally to being greater than the sum value. Refer to a stage 3 and a stage 4 in FIG. 11. The sum value is θ+t, and the point d is a new target inflection point.

During the stage 1 and the stage 2, when the second deflection degree variation does not reach the sum value, the deflection degree values begin to decrease, and the process is into a stage 5. If the deflection degree values continue to decrease, the process is into the stage 4 from the stage 5.

In some embodiments, after a trend of the deflection degree values in the control signal changes from incrementing to decrementing, the backlash filtering is performed on the control signal. The second deflection degree variation being less than the backlash filtering coefficient indicates that the backlash is not eliminated. In this case, the updated deflection values output by the backlash filter are not adjusted. In other words, the output updated deflection values are equal to the updated deflection value at the new target inflection point, so that miss processing on the video frames caused by the noise is avoided. Because the second deflection degree variation being greater than the backlash filtering coefficient indicates that the deflection degree values are generated by changes of the poses of the part, only when the second deflection degree variation is greater than the backlash filtering coefficient, that is, the backlash is eliminated, the updated deflection values are obtained by performing linear transformation on the deflection degree values, so that the video frames are effectively processed.

In some embodiments, the plurality of video frames are video frames obtained in real-time, and the control signal is used for describing a trend of the deflection degree values changing over time. The performing backlash filtering on the control signal to obtain updated deflection values used for representing processing on the plurality of video frames includes: determining, by using the backlash filter, a first deflection degree variation relative to a target inflection point in a process in which the deflection degree values in the control signal begin to decrement over time; comparing the first deflection degree variation with the backlash filtering coefficient to obtain a comparison result; and using, in a case that the comparison result indicates that the first deflection degree variation is less than or equal to the backlash filtering coefficient, an updated deflection value at the target inflection point as the updated deflection values used for representing processing on the plurality of video frames.

In the process in which the deflection degree values in the control signal begin to decrement over time, the target inflection point may be a point at which the deflection degree values change from incrementing to decrementing (such as a peak point in the control signal). For example, a point a shown in FIG. 9 is a target inflection point.

In the process in which the deflection degree values in the control signal begin to decrement over time, the first deflection degree variation is an absolute value of a difference between two deflection degree values. Therefore, even if the deflection degree value decrements over time, the corresponding first deflection degree variation still increments over time.

In some embodiments, after the deflection degree values in the control signal change from decrementing to incrementing, a deflection degree of the target inflection point is used as a base value to calculate the first deflection degree variation to obtain the first deflection degree variation relative to the target inflection point.

In some embodiments, the control signal may fluctuate due to impacts of changes of the poses of the part and the noise. When the control signal changes from incrementing to decrementing (that is, the deflection degree values in the control signal begin to decrement over time), the terminal begins to calculate the first deflection degree variation in real-time from the target inflection point.

For example, as shown in FIG. 9, the deflection degree values in the control signal begin to decrement from a t(i) moment. The terminal begins to calculate the first deflection degree variation in real-time from the t(i) moment. When a t(j) moment is reached, a difference between deflection degree values at the two moments t(i) and t(j) is calculated to obtain the first deflection degree variation $\Delta g=|g(t(i))-g(t(j))|$ at the t(j) moment. When a t(k) moment is reached, a difference between deflection degree values at the two moments t(i) and t(k) is calculated to obtain the first deflection degree variation $\Delta g=|g(t(i))-g(t(k))|$ at the t(k) moment. Because the point b is the target inflection point, the terminal may begin to re-calculate the first deflection degree variation from the point b.

In some embodiments, in a case that the deflection degree values in the control signal begin to decrement over time, the terminal may compare the first deflection degree variation with the backlash filtering coefficient to obtain a third comparison result. For a process of the terminal determining the third comparison result, refer to the process of determining the first comparison result in operation 804.

In some embodiments, the terminal obtains the updated deflection value at the target inflection point, and then uses the updated deflection value at the target inflection point as the updated deflection values of the part in the video frames. As shown in FIG. 10, in a case that the deflection degree values in the control signal begin to decrement over time, the plurality of video frames in the "using an updated deflection value at the target inflection point as the updated deflection values used for representing processing on the plurality of video frames" are at least one video frame obtained at time of a stage 3.

In some embodiments, the terminal may process the control signal by using a backlash filter. The backlash filtering coefficient is a filtering parameter of the backlash filter. Specifically, the control signal may be input in the backlash filter. In the process in which the deflection degree values in the control signal begin to decrement over time, the backlash filter determines the first deflection degree variation relative to the target inflection point. The backlash filter compares the first deflection degree variation with the backlash filtering coefficient to obtain the third comparison result. In addition, in a case that the third comparison result indicates that the first deflection degree variation is less than or equal to the backlash filtering coefficient, the updated deflection value at the target inflection point is output as the updated deflection value of the plurality of video frames.

In some embodiments, in the process in which the deflection degree values in the control signal begin to decrement over time, the first deflection degree variation being less than or equal to the backlash filtering coefficient indicates that changes of the deflection degree values may be caused by the noise, and this corresponds to a case that a primary gear changes a motion state, but does not complete a return corresponding to a backlash, so that a motion state of a secondary gear does not change, that is, the backlash is not eliminated. In this case, the updated deflection values are not adjusted, the updated deflection values are equal to the updated deflection value at the target inflection point, so that an impact on the updated deflection values caused by the noise may be eliminated through the backlash filtering, to avoid miss processing on the video frame caused by the noise.

In some embodiments, the video frame processing method further includes: comparing, in a case that the third comparison result indicates that the first deflection degree variation is greater than the backlash filtering coefficient, the first deflection degree variation with a sum value to obtain a fourth comparison result, the sum value being obtained by summing the backlash filtering coefficient and a preset parameter; and performing, in a case that the fourth comparison result indicates that the first deflection degree variation is less than or equal to the sum value, linear transformation on the decremented deflection degree values to obtain the updated deflection values used for representing processing on the plurality of video frames.

In some embodiments, in a case that the deflection degree values in the control signal begin to decrement over time, when the third comparison result indicates that the first deflection degree variation is greater than the backlash filtering coefficient, the terminal performs summing on the backlash filtering coefficient and the preset parameter to obtain the sum value. The first deflection degree variation is compared with the sum value to obtain the fourth comparison result. When the fourth comparison result indicates that the first deflection degree variation is less than or equal to the sum value, linear transformation is performed on the decremented deflection degree values to obtain the updated deflection values of the part in the video frames. In some embodiments, the plurality of video frames in the "performing linear transformation on the decremented deflection degree values to obtain the updated deflection value used for representing processing on the plurality of video frames" are at least one video frame obtained at time of a stage 4.

In some embodiments, in the process in which the deflection degree values in the control signal begin to decrement over time, the first deflection degree variation being greater than the backlash filtering coefficient indicates that changes of the deflection degree values may be caused by changes of the poses of the part, and this corresponds to a case that the primary gear changes the motion state, and completes the return corresponding to the backlash, so that the motion state of the secondary gear changes, that is, the backlash is eliminated. Therefore, when the first deflection degree variation is greater than the backlash filtering coefficient, the linear transformation is performed on the incremented deflection degree values to obtain the updated deflection values used for representing processing on the plurality of video frames, so that the video frames are effectively processes.

In some embodiments, the video frame processing method further includes: obtaining, in a case that the fourth comparison result indicates that the first deflection degree variation is greater than the sum value, updated deflection values in a case that the first deflection degree variation is equal to the sum value; and using the obtained updated deflection values as the updated deflection values used for representing processing on the plurality of video frames.

In some embodiments, when the first deflection degree variation increases to the sum value, the output updated deflection values do not increase. For a process of the "obtaining an updated deflection value in a case that the first deflection degree variation is equal to the sum value; and using the obtained updated deflection value as the updated deflection values used for representing processing on the plurality of video frames", refer to the descriptions for the "obtaining an updated deflection value in a case that the first deflection degree variation is equal to the sum value; and using the obtained updated deflection value as the updated deflection values used for representing processing on the plurality of video frames" in a case that the deflection degree value begins to increment in some embodiments.

In some embodiments, when the first deflection degree variation increases to the sum value, the output updated deflection values does not increase continuously. In this case, the updated deflection value when the first deflection degree variation is equal to the sum value is used as the updated deflection value used for representing processing on the plurality of video frames. The video frames are processed according to the updated deflection value corresponding to the sum value, so that the video frames can be effectively processed according to a highest degree of an image processing state.

In some embodiments, after the using, in a case that the third comparison result indicates that the first deflection degree variation is less than or equal to the backlash filtering coefficient, an updated deflection value at the target inflection point as the updated deflection values of the part in the video frames, the video frame processing method further includes: determining, in a case that it is detected that the deflection degree values in the control signal begin to increment over time, a second deflection degree variation by using a deflection degree value beginning to increment as a base value; and determining, according to an updated deflection value at a new target inflection point in a case that the second deflection degree variation is less than the backlash filtering coefficient, the updated deflection values used for representing processing on the plurality of video frames, the new target inflection point being an inflection point formed after the target inflection point.

In some embodiments, when the deflection degree values in the control signal change from beginning to increment to beginning to decrement, and the first deflection degree variation after beginning to decrement is less than the backlash filtering coefficient, the deflection degree values change from beginning to decrement to beginning to increment. An inflection point at which the deflection degree values change from beginning to increment to beginning to decrement is the target inflection point, and an inflection point at which the deflection degree values change from beginning to decrement to beginning to increment is the new target inflection point. When the deflection degree values change again from beginning to decrement to beginning to increment, and the second deflection degree variation after beginning to increment is less than the backlash filtering coefficient, the updated deflection value at the target inflection point is used as the updated deflection values of the part in the video frames at the stage in which the deflection degree values begin to increment and the second deflection degree variation is less than the backlash filtering coefficient.

In some embodiments, after a trend of the deflection degree values in the control signal changes from decrementing to incrementing, the backlash filtering is performed on the control signal. The second deflection degree variation being less than the backlash filtering coefficient indicates that the backlash is not eliminated. In this case, the updated deflection values output by the backlash filter are not adjusted. In other words, the output updated deflection values are equal to the updated deflection value at the new target inflection point, so that miss processing on the video frames caused by the noise is avoided. Because the second deflection degree variation being greater than the backlash filtering coefficient indicates that the deflection degree values are generated by changes of the poses of the part, only when the second deflection degree variation is greater than the backlash filtering coefficient, that is, the backlash is eliminated, the updated deflection values are obtained by performing linear transformation on the deflection degree values, so that the video frames are effectively processed.

In some embodiments, the part includes a face, and the poses includes pitch angles, yaw angles, and roll angles of the face in the plurality of video frames. The determining deflection degree values of the part in the plurality of video frames according to the poses of the part includes: performing normalization on the pitch angles, the yaw angles, and the roll angles of the face in the plurality of video frames to obtain a normalized pitch angle, a normalized yaw angle, and a normalized roll angle; determining a product value of the normalized pitch angle, the normalized yaw angle, and the normalized roll angle; and determining a deflection degree value of the face in each video frame based on the product value.

The pitch angle, the yaw angle, and the roll angle are described with reference to a Cartesian coordinate system of three-dimensional space. A plane formed by an x axis and a z axis of the Cartesian coordinate system is parallel to a horizontal plane. The x axis corresponds to a direction from the left ear to the right ear of the head of a human being. The z axis corresponds to a direction form the face to the back of the head of the human being. A y axis of the Cartesian coordinate system is a direction axis of a height direction of the human being. The pitch angle (pitch) rotates about the x axis, such as changes of the pitch angle of the face caused by raising the head or lowering the head. The yaw angle (yaw) rotates about the y axis, such as changes of the yaw angle of the face caused by rotating the head from left to right. The roll angle (roll) rotates about the z axis, such as changes of the roll angle caused by rotating the head so that the top of the head is closer to the left shoulder.

In some embodiments, the terminal obtains a preset maximum pitch angle and a preset minimum pitch angle of the pitch angle, a preset maximum yaw angle and a preset minimum yaw angle of the yaw angle, and a preset maximum roll angle and a preset minimum roll angle of the roll angle. For each video frame, the terminal performs normalization on the pitch angle of the face in the video frame according to the preset maximum pitch angle and the preset minimum pitch angle to obtain a normalized pitch angle of the face in the video frame. The terminal performs normalization on the yaw angle of the face in the video frame according to the preset maximum yaw angle and the preset minimum yaw angle to obtain a normalized yaw angle of the face in the video frame. The terminal performs normalization on the roll angle of the face in the video frame according to the preset maximum roll angle and the preset minimum roll angle to obtain a normalized roll angle of the face in the video frame.

A pose that the face directly faces to a display screen of the terminal is used as a reference pose, a pitch angle corresponding to the reference pose is the preset minimum pitch angle, a yaw angle corresponding to the reference pose is the preset minimum yaw angle, and a roll angle corresponding to the reference pose is the preset minimum roll angle. Relative to the face directly facing the display screen of the terminal, the preset maximum pitch angle may be a maximum angle reached by raising the head or lowering the head. Similarly, relative to the face directly facing the display screen of the terminal, the preset maximum yaw angle may be a maximum angle reached by the head rotating about the y axis, and the preset maximum roll angle may be a maximum angle reached by the head rotating about the z axis. For example, the preset minimum pitch angle is 0 degree and the preset maximum pitch angle is 90 degrees, the preset minimum yaw angle is 0 degree and the preset maximum yaw angle is 90 degrees, and the minimum preset roll angle is 0 degree and the maximum preset roll angle is 90 degrees.

In some embodiments, the terminal performing normalization on the pitch angle of the face in the video frame according to the preset maximum pitch angle and the preset minimum pitch angle to obtain a normalized pitch angle of the face in the video frame may be the terminal calculating a first pitch angle difference between the pitch angle of the face in the video frame and the preset minimum pitch angle, a second pitch angle difference between the preset maximum pitch angle and the preset minimum pitch angle, and a ratio of the first pitch angle difference to the second pitch angle difference, to obtain the normalized pitch angle, as shown in Formula (1).

$$\mathrm{pitch}_{t1} = \frac{\mathrm{pitch}_1 - \mathrm{pitch}_{min}}{\mathrm{pitch}_{max} - \mathrm{pitch}_{min}} \tag{1}$$

$\mathrm{pitch}_{t1}$ is a normalized pitch angle of the face in a video frame t1, $\mathrm{pitch}_1$ is a pitch angle of the face in the video frame t1, $\mathrm{pitch}_{min}$ is the preset minimum pitch angle, and $\mathrm{pitch}_{max}$ is the preset maximum pitch angle. A value range of the normalized pitch angle is [0, 1].

According to the same manner, the terminal calculates a first yaw angle difference between the yaw angle of the face in the video frame and the preset minimum yaw angle, a second yaw angle difference between the preset maximum yaw angle and the preset minimum yaw angle, and a ratio of the first yaw angle difference to the second yaw angle difference, to obtain the normalized yaw angle, as shown in Formula (2).

$$\mathrm{yaw}_{t1} = \frac{\mathrm{yaw}_1 - \mathrm{yaw}_{min}}{\mathrm{yaw}_{max} - \mathrm{yaw}_{min}} \tag{2}$$

$\mathrm{yaw}_{t1}$ is a normalized yaw angle of the face in the video frame t1, $\mathrm{yaw}_1$ is a yaw angle of the face in the video frame t1, $\mathrm{yaw}_{min}$ is the preset minimum yaw angle, and $\mathrm{yaw}_{max}$ is the preset maximum yaw angle. A value range of the normalized yaw angle is [0, 1].

The terminal calculates a first roll angle difference between the roll angle of the face in the video frame and the preset minimum roll angle, a second roll angle difference between the preset maximum roll angle and the preset minimum roll angle, and a ratio of the first roll angle difference and the second roll angle difference, to obtain the normalized roll angle, as shown in Formula (3).

$$\mathrm{roll}_{t1} = \frac{\mathrm{roll}_1 - \mathrm{roll}_{min}}{\mathrm{roll}_{max} - \mathrm{roll}_{min}} \tag{3}$$

$\mathrm{roll}_{t1}$ is a normalized roll angle of the face in the video frame t1, $\mathrm{roll}_1$ is a roll angle of the face in the video frame t1, $\mathrm{roll}_{min}$ is the preset minimum roll angle, and $\mathrm{roll}_{max}$ is the preset maximum roll angle. A value range of the normalized roll angle is [0, 1].

The terminal multiplies the normalized yaw angle, the normalized pitch angle, and the normalized roll angle of the face in the video frame, to obtain a deflection degree value of the face in the video frame, as shown in Formula (4).

$$g_{t1} = \mathrm{pitch}_{t1} \times \mathrm{yaw}_{t1} \times \mathrm{roll}_{t1} \tag{4}$$

$g_{t1}$ is a deflection degree value of the face in the video frame t1, $\mathrm{pitch}_{t1}$ is the normalized pitch angle of the face in the video frame t1, $\mathrm{yaw}_{t1}$ is the normalized yaw angle of the face in the video frame t1, and $\mathrm{roll}_{t1}$ is the normalized roll angle of the face in the video frame t1. Because the value ranges of the normalized yaw angle, the normalized pitch angle, and the normalized roll angle all are [0, 1], a value range of the deflection degree value is [0, 1].

In some embodiments, when the part is the face, the pose of the face is used for reflecting an orientation of the face. The terminal determines the deflection degree value based on the pose of the face. The deflection degree value of the face in the video frame is used for representing a deflection degree of the orientation of the face in the video frame relative to the face directly facing a display screen, so that the deflection degree value of the face in the video frame is used as the control signal subsequently, and the control signal is used for determining whether to perform image processing on the video frame or determining a degree of performing image processing on the video frame.

In some embodiments, the generating a control signal based on the deflection degree values includes: obtaining time sequence identifiers of the plurality of video frames; and generating the control signal according to the time sequence identifiers and the deflection degree values of the part in the plurality of video frames, the control signal being used for describing a trend of the deflection degree values changing over time.

The time sequence identifiers of the plurality of video frames may be used for reflecting a playing time sequence of the plurality of video frames. The playing time sequence of the plurality of video frames is the same as an obtaining time sequence of the video frames, so that the time sequence identifiers of the plurality of video frames may be used for reflecting the obtaining time sequence of the plurality of video frames. The time sequence identifiers may be represented by values. A smaller value corresponding to a time sequence identifier indicates later playing time of a video frame corresponding to the time sequence identifier, and a greater value corresponding to a time sequence identifier indicates earlier playing time of a video frame corresponding to the time sequence identifier.

In some embodiments, the terminal may determine a deflection degree value of each video frame in sequence according to the playing time sequence of the plurality of video frames (the obtaining time sequence of). For each video frame, the terminal determines a point signal of the video frame according to the deflection degree value and a playing sequence of the video frame. The terminal generates the control signal according to point signals corresponding to the plurality of video frames. Because the control signals are determined according to the playing time sequence (the obtaining time sequence) and the deflection degree values of the plurality of video frames, a trend that is of the plurality of video frames and that describes the deflection degree values change over the playing time (obtaining time) may be determined by using the control signal.

In some embodiments, the terminal determines the control signal according to the playing time sequence of and the deflection degree values of the plurality of video frames. The trend of the deflection degree values of the plurality of video frames changing over the playing time may be determined intuitively by using the control signal.

In some embodiments, the extracting poses of a part of the object in the plurality of video frames includes: determining, in a case that an eye contact function item of an application is ON, poses of the face of the object in the plurality of video frames carrying noise, the application being an application program playing the plurality of video frames.

In some scenarios, a meeting may be hold by using the application. In the scenario, an object in video frames may be an attendance, for example, a meeting speaker among the attendances. In some scenarios, live streaming may be performed by using the application. In the scenario, an object in video frames may be a host performing the live streaming. In some scenarios, a video call may be made by using the application. In the scenario, an object in video frames may be two parties participating in the video call. The foregoing scenarios are some examples for possible scenarios. The application may be applied in another scenario, which is not limited.

The eye contact refers to eye contact between an object and a object, that is, an object and a viewing object look at each other, and the viewing object is an object viewing the plurality of video frames. The eye contact function may implement, in a case that the object does not look directly into a camera of a video acquisition device, an effect of the object and the viewing object looking at each other.

There may be a plurality of cases that an object does not look directly into a camera of a video acquisition device. For example, during a video call, two parties of the video call do not look into a camera of a video acquisition device for viewing the face of another. For another example, during a meeting, to view content of the speech, a meeting speaker does not look directly into a camera of a video acquisition device. For another example, during a live streaming, to view real-time comments of audiences, a host does not look directly into a camera of a video acquisition device.

The eye contact function item is a setting item used for enabling or disabling the eye contact function of an application.

In some embodiments, the terminal obtains an ON-OFF state of the eye contact function item of the application. If the ON-OFF state of the eye contact function item is an ON state, eye contact processing may be performed on the plurality of video frames. The eye contact processing is performed on pixel points corresponding to an eye of the object in the video frame. Only when a degree of the face of the object directly facing the display screen reaches an eye contact processing condition, the pixel points corresponding to the eye of the object in the video frame are processed. In addition, a degree of processing the pixel points corresponding to the eye of the object is related to the degree of the face of the object directly facing the display screen.

Therefore, the part of the object is the face. In a case that the eye contact function item of the application is ON, the terminal determine the poses of the face of the object in the plurality of video frames carrying noise, to determine, based on the poses of the face in the plurality of video frames carrying noise, whether to perform eye contact processing on the object, and determine a degree of the eye contact processing.

Figure 13:
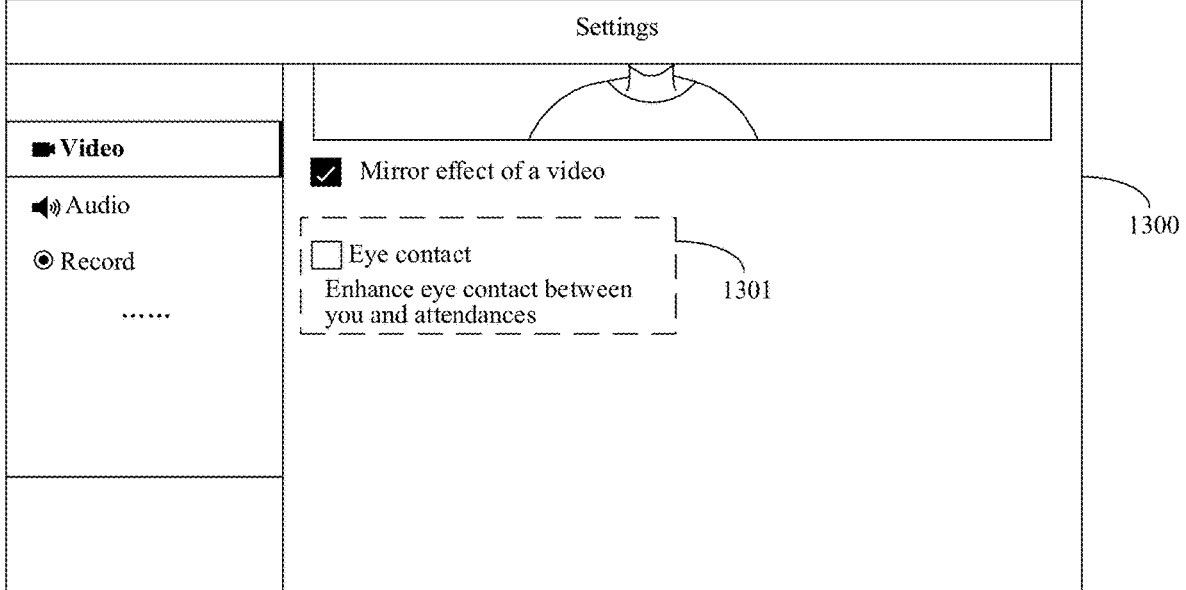
FIG. 13 is a schematic diagram of a setting page of an application according to some embodiments.

In some embodiments, for an application operated on the terminal, an ON-OFF state of an eye contact function item of the application may be adjusted by the terminal, as shown in FIG. 13. A setting page 1300 of the application includes an eye contact function item control 1301. In response to a trigger operation for the eye contact function item control 1301, the ON-OFF state of the eye contact function item is modified. For example, if the eye contact function item is ON before the eye contact function item control 1301 is triggered, the eye contact function item is OFF after the eye contact function item control 1301 is triggered. Alternatively, if the eye contact function item is OFF before the eye contact function item control 1301 is triggered, the eye contact function item is ON after the eye contact function item control 1301 is triggered.

The ON-OFF state of the eye contact function item may be determined through a display style of the eye contact function item control 1301. For example, the eye contact function item control 1301 includes a selected box. When the ON-OFF state of the eye contact function item is ON, the selected box of the eye contact function item control 1301 includes a selected icon, and when the ON-OFF state of the eye contact function item is OFF, the selected box of the eye contact function item control 1301 does not include the selected icon. As shown in FIG. 13, the selected box of the eye contact function item control 1301 does not include the selected icon, and in this case, the ON-OFF state of the eye contact function item is OFF. The eye contact function control 1301 may further include description information of the eye contact function. As shown in FIG. 13, the description information of the eye contact function includes "enhance eye contact between you and attendances".

In some embodiments, in a case that the eye contact function is ON, the terminal determines the poses of the face of the object in the plurality of video frames carrying noise, to determine, based on the poses of the face in the plurality of video frames carrying noise, whether to perform eye contact processing on the object, and determine the degree of the eye contact processing.

In some embodiments, the performing image processing on the plurality of video frames in sequence based on the updated deflection values in the plurality of video frames includes: obtaining positions of an original eye feature point in the plurality of video frames; obtaining a target eye feature point according to the updated deflection values in the plurality of video frames; and fusing the target eye feature point into the plurality of video frames according to the positions, to replace the original eye feature point in the plurality of video frames.

The eye feature point is a feature point that affects an eye direction, and the eye direction is a line-of-sight. The eye feature point is adjusted to implement adjustment of the eye direction. The line-of-sight is adjusted to enable the adjusted line-of-sight to look directly into a camera of a video acquisition device. The eye feature point may be a pixel point corresponding to an eyeball.

The position of the eye feature point in the video frame is a pixel point area of the eye feature point in the video frame. In a case that the eye feature point is the pixel point corresponding to the eyeball, the position of the eye feature point is a pixel point area of the pixel point corresponding to the eyeball.

The target eye feature point may be a pixel point corresponding to the eyeball after the updated deflection value is adjusted.

In some embodiments, the updated deflection value of the video frame may be used for reflecting a degree of performing eye contact processing on the video frame. A greater updated deflection value indicates a greater updated deflection value of the video frame and a higher degree of performing eye contact processing on the video frame, and a less updated deflection value of the video frame indicates a lower degree of performing eye contact processing on the video frame.

In some embodiments, for each video frame, if the updated deflection value of the video frame is not 0 (if the updated deflection value of the video frame is 0, eye contact processing is not performed on the video frame), pixel coordinates corresponding to the target eye feature point in the video frame is obtained. If the updated deflection value of the video frame is not 0 but the object in the video frame is in an eye closed state, a position of the original eye feature point in the video frame cannot be obtained. In this case, eye contact processing is not performed on the video frame.

The obtaining the target eye feature point according to the updated deflection value in the video frame may be performing eye contact processing on the video frame according to the updated deflection value to obtain the target eye feature point. The performing eye contact processing on the video frame according to the updated deflection value may be: sending the updated deflection values and feature points of the face in the video frame into a deep neural network, recognizing eye related information in the feature points of the face by using the deep neural network, and obtaining the target eye feature point based on the eye related information. The process of performing eye contact processing on the updated deflection value and the video frame by using the deep neural network may be implemented by an existing manner.

The fusing the target eye feature point in the video frame according to the position of the eye feature point in the video frame may be replacing a pixel value corresponding to the original eye feature point by a pixel value corresponding to the target eye feature point, to replace the original eye feature point in the video frame.

For example, the eye feature point is a pixel point corresponding to the eyeball. In a video frame t1, a position of a pixel point s1 corresponding to an original eyeball is determined as an area p1, and a pixel value corresponding to the area p1 is r1 (that is, a pixel value of the pixel point corresponding to the original eyeball is r1). The target eye feature point is determined according to an updated deflection value of the video frame t1. The target eye feature point is a pixel point corresponding to the adjusted eyeball. A pixel value corresponding to a pixel point of the adjusted eyeball is r2. The pixel value corresponding to the area p1 in the video frame t1 is modified from r1 to r2, to replace the pixel point corresponding to the original eyeball in the video frame t1.

In some embodiments, the terminal obtains the target eye feature point according to the updated deflection value of the video frame, to replace the original eye feature point in the video frame with the target eye feature point. Because the updated deflection value is affected by noise, the target eye feature point is also affected by the noise. If the noise causes frequent changing of the updated deflection values of the plurality of video frames between updated deflection values corresponding to two degrees of the eye contact processing, an eye contact effect of the eye of the object may be unstable and unnatural due to frequent flickering of the eye contact processing across the plurality of video frames. In the foregoing embodiments, the updated deflection value of the video frame is output by a backlash filter. The backlash filter filters out the impact of the noise on the updated deflection value. This avoids the frequent changing, caused by the noise, of the updated deflection values of the plurality of video frames between the updated deflection values corresponding to the two degrees of the eye contact processing, improves stability of the updated deflection values, and improves stability of an eye contact effect, so that the eye contact effect is more natural.

In some embodiments, the part includes a hand. The performing image processing on the plurality of video frames in sequence based on the updated deflection values in the plurality of video frames includes: obtaining special effect data in a case that the updated deflection values in the plurality of video frames satisfy a special effect adding condition; and adding the special effect data in the plurality of video frames.

When the part is a hand, the updated deflection value of the video frame is a first updated value or a second updated value. The updated deflection value of the video frame being the first updated value indicates that image processing may be performed on the video frame, and the updated deflection value of the video frame being the second updated value indicates that image processing may not need to be performed on the video frame. The special effect adding condition includes: the updated deflection value being the first updated value.

In some embodiments, for each video frame, the terminal obtains the updated deflection value of the video frame. If the updated deflection value of the video frame is the first updated value, the special effect data is obtained, and the special effect data is added in the video frame.

For example, the first updated value is 1, and the second updated value is 0. If the updated deflection value of the video frame is 1, the special effect data is obtained, and the special effect data is added in the video frame. If the updated deflection value is 0, the special effect data is not added in the video frame.

In some embodiments, the determining poses of a part of the object in the plurality of video frames carrying noise includes: determining, in response to an ON request for a gesture special effect control on a video playing page, the poses of the hand of the object in the plurality of video frames carrying the noise.

The gesture special effect control is configured to add the special effect data for the video frame based on a gesture. The video playing page may include a plurality of gesture special effect controls, to implement various special effect data adding manners, which include but not limited to: adding a plurality of pieces of special effect data based on a first gesture, adding the plurality of pieces of pieces of special effect databased on a second gesture, and adding the plurality of pieces of special effect data based on a third gesture. For example, the first gesture may be a gesture that represents "yeah", the second gesture may be a gesture that represents "OK", and the third gesture may be a gesture that represents "1". The plurality of pieces of special effect data include but not limited to adding a plurality of special effect icons in the video frame and adding a plurality of special effect words in the video frame. The plurality of special effect icons and the plurality of special effect words are not limited in some embodiments.

In some embodiments, the application runs on the terminal and includes a video playing page. The video playing page includes a gesture special effect function item. The terminal determines, in response to a trigger operation for the gesture special effect function item, the poses of the hand of the object in the plurality of video frames carrying the noise.

In some embodiments, the terminal determines whether the updated deflection value of the video frame satisfies a special effect condition. If the updated deflection value of the video frame satisfies the special effect adding condition, the special effect data is added in the video frame. Because the updated deflection value is affected by the noise, whether to add the special effect data in the video frame is also affected by the updated deflection value. If noise causes frequent changing of the updated deflection values of the plurality of video frames between satisfying the special effect condition and not satisfying the special effect condition, the plurality of video frames also frequently change between having the special effect data added therein and not having the special effect data added therein, for example, the video frames sometimes have special effect icons and sometimes have no special effect icons, resulting in an unstable function of adding the special effect data. In some embodiments, the updated deflection value of the video frame is output by the backlash filter. The backlash filter filters out the impact of the noise on the updated deflection value. This avoids the frequent changing of the updated deflection values of the plurality of video frames between satisfying the special effect condition and not satisfying the special effect condition caused by the noise and improve stability of the updated deflection values, thereby improving stability of the function of adding the special effect data.

Figure 14:
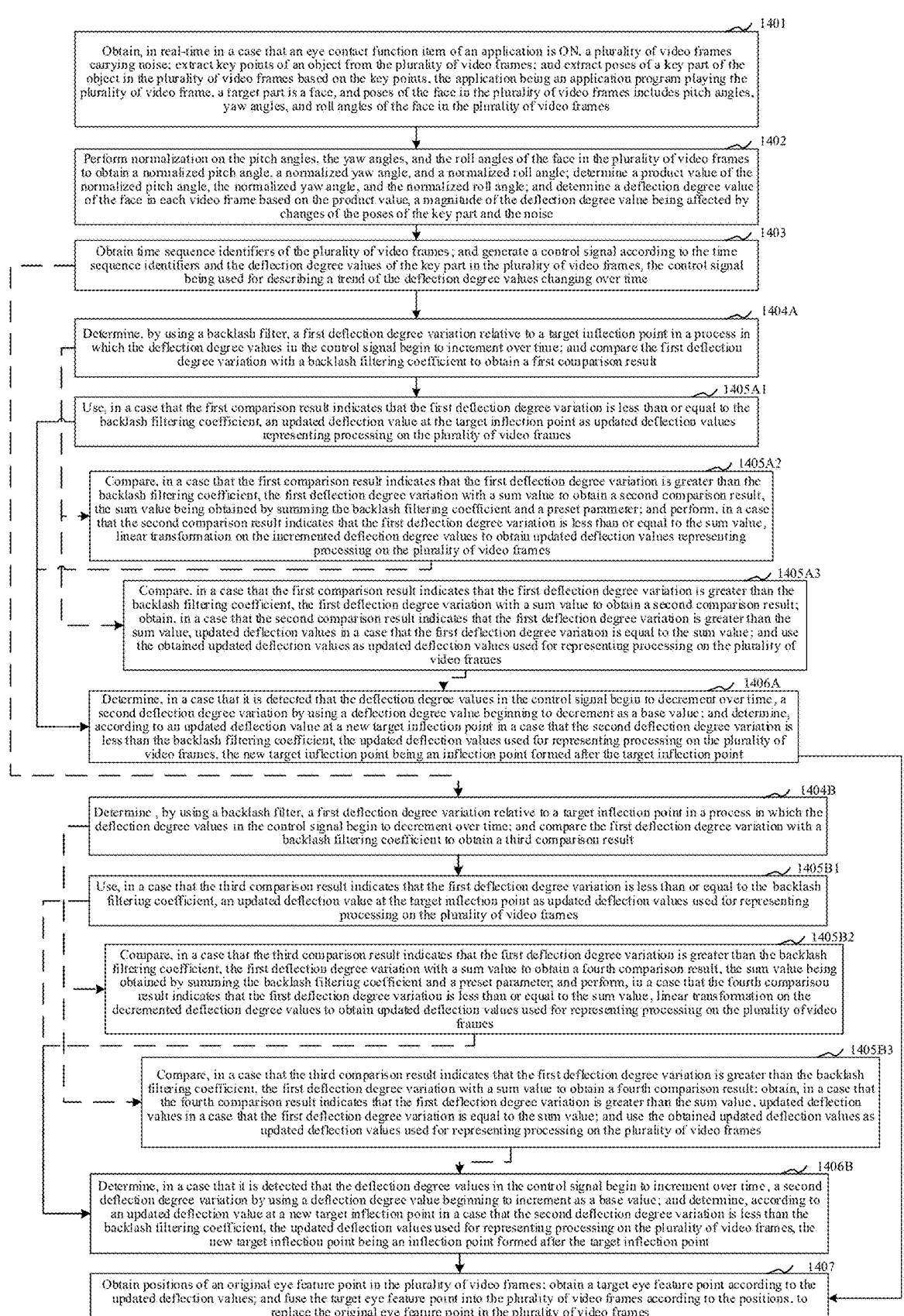
FIG. 14 is a schematic diagram of a video frame processing method according to some embodiments.

In some embodiments, as shown in FIG. 14, the video frame processing method further includes:

1401: Obtain, in real-time in a case that an eye contact function item of an application is ON, a plurality of video frames carrying noise; extract points of an object from the plurality of video frames; and extract poses of a part of the object in the plurality of video frames based on the points, the application being an application program playing the plurality of video frame, a target part is a face, and poses of the face in the plurality of video frames includes pitch angles, yaw angles, and roll angles of the face in the plurality of video frames.

1402: Perform normalization on the pitch angles, the yaw angles, and the roll angles of the face in the plurality of video frames to obtain a normalized pitch angle, a normalized yaw angle, and a normalized roll angle; determine a product value of the normalized pitch angle, the normalized yaw angle, and the normalized roll angle; and determine a deflection degree value of the face in each video frame based on the product value, a magnitude of the deflection degree value being affected by changes of the poses of the part and the noise.

1403: Obtain time sequence identifiers of the plurality of video frames; and generate a control signal according to the time sequence identifiers and the deflection degree values of the part in the plurality of video frames, the control signal being used for describing a trend of the deflection degree values changing over time.

1404A: Determine, by using a backlash filter, a first deflection degree variation relative to a target inflection point in a process in which the deflection degree values in the control signal begin to increment over time; and compare the first deflection degree variation with a backlash filtering coefficient to obtain a first comparison result.

1405A1: Use, in a case that the first comparison result indicates that the first deflection degree variation is less than or equal to the backlash filtering coefficient, an updated deflection value at the target inflection point as updated deflection values representing processing on the plurality of video frames.

1405A2: Compare, in a case that the first comparison result indicates that the first deflection degree variation is greater than the backlash filtering coefficient, the first deflection degree variation with a sum value to obtain a second comparison result, the sum value being obtained by summing the backlash filtering coefficient and a preset parameter; and perform, in a case that the second comparison result indicates that the first deflection degree variation is less than or equal to the sum value, linear transformation on the incremented deflection degree values to obtain updated deflection values representing processing on the plurality of video frames.

1405A3: Compare, in a case that the first comparison result indicates that the first deflection degree variation is greater than the backlash filtering coefficient, the first deflection degree variation with a sum value to obtain a second comparison result; obtain, in a case that the second comparison result indicates that the first deflection degree variation is greater than the sum value, updated deflection values in a case that the first deflection degree variation is equal to the sum value; and use the obtained updated deflection values as updated deflection values used for representing processing on the plurality of video frames.

1406A: Determine, in a case that it is detected that the deflection degree values in the control signal begin to decrement over time, a second deflection degree variation by using a deflection degree value beginning to decrement as a base value; and determine, according to an updated deflection value at a new target inflection point in a case that the second deflection degree variation is less than the backlash filtering coefficient, the updated deflection values used for representing processing on the plurality of video frames, the new target inflection point being an inflection point formed after the target inflection point.

1404B: Determine, by using a backlash filter, a first deflection degree variation relative to a target inflection point in a process in which the deflection degree values in the control signal begin to decrement over time; and compare the first deflection degree variation with a backlash filtering coefficient to obtain a third comparison result.

1405B1: Use, in a case that the third comparison result indicates that the first deflection degree variation is less than or equal to the backlash filtering coefficient, an updated deflection value at the target inflection point as updated deflection values used for representing processing on the plurality of video frames.

1405B2: Compare, in a case that the third comparison result indicates that the first deflection degree variation is greater than the backlash filtering coefficient, the first deflection degree variation with a sum value to obtain a fourth comparison result, the sum value being obtained by summing the backlash filtering coefficient and a preset parameter; and perform, in a case that the fourth comparison result indicates that the first deflection degree variation is less than or equal to the sum value, linear transformation on the decremented deflection degree values to obtain updated deflection values used for representing processing on the plurality of video frames.

1405B3: Compare, in a case that the third comparison result indicates that the first deflection degree variation is greater than the backlash filtering coefficient, the first deflection degree variation with a sum value to obtain a fourth comparison result; obtain, in a case that the fourth comparison result indicates that the first deflection degree variation is greater than the sum value, updated deflection values in a case that the first deflection degree variation is equal to the sum value; and use the obtained updated deflection values as updated deflection values used for representing processing on the plurality of video frames.

1406B: Determine, in a case that it is detected that the deflection degree values in the control signal begin to increment over time, a second deflection degree variation by using a deflection degree value beginning to increment as a base value; and determine, according to an updated deflection value at a new target inflection point in a case that the second deflection degree variation is less than the backlash filtering coefficient, the updated deflection values used for representing processing on the plurality of video frames, the new target inflection point being an inflection point formed after the target inflection point.

1407: Obtain positions of an original eye feature point in the plurality of video frames; obtain a target eye feature point according to the updated deflection values; and fuse the target eye feature point into the plurality of video frames according to the positions, to replace the original eye feature point in the plurality of video frames.

According to the foregoing video frame processing method, the poses of the part of the object in the video frames carrying noise are obtained. The deflection degree values of the part in the video frames are determined according to the poses of the part. The control signal is generated based on the deflection degree values of the video frames. Backlash filtering is performed on the control signal by using the backlash filter according to the backlash filtering coefficient to obtain the updated deflection values of the part in the video frames. Then, image processing is performed on the video frames in sequence according to the updated deflection values in the video frames. Because the video frame carries the noise, the poses of the part is affected by the noise, the deflection degree values of the part are also affected by the noise. The control signal has jitter caused by the noise, resulting in an impact of the noise on the updated deflection values, and consequently, jitter is generated when the image processing is performed on the video frame, for example, the noise causes frequently changing of the image processing between two different states. According to the foregoing video frame processing method, the jitter on the control signal caused by the noise is filtered out by using the backlash filter according to the backlash filtering coefficient, and then, the updated deflection values of the video frames are determined according to the filtered control signal. An impact of the noise on the updated deflection values is filtered out by the backlash filter, and the jitter caused by the noise and when image processing is performed on the video frame is also eliminated, so that stability of the video frame after the image processing is improved.

In some embodiments, the video frames are viewed by using a terminal through a video playing page of the application. The video playing page includes a gesture special effect control. The gesture special effect control is configured to add a "petal" icon in the video frame when a hand pose is recognized as a gesture representing "OK".

The terminal determines, in response to that the gesture special effect control of the video playing page is triggered, poses that are of a hand of the object of the video frames and that are in the video frames carrying the noise. The deflection degree values of the hand in the video frames are determined according to the poses of the hand in the video frames. A control signal is generated based on the deflection degree values of the hand in the video frames. Backlash filtering is performed on the control signal by using a backlash filter according to a backlash filtering coefficient to obtain updated deflection values of the hand in the video frames. For each video frame, if the updated deflection value in the video frame satisfies a special effect adding condition, the "petal" icon is added in the video frame.

For example, if an updated deflection value is 0 when the hand is in a t1 frame, a "petal" icon is not added in the t1 frame, and if an updated deflection value is 1 when the hand is in a t2 frame, a "petal" icon is added in the t2 frame. In this case, a variation between the deflection degree value of the hand in the t1 frame and the deflection degree value of the hand in the t2 frame is greater than the backlash filtering coefficient.

It is to be understood that although operations in flowcharts described are displayed in sequence according to indication of arrows, these operations are not necessarily performed in sequence according to a sequence indicates by the arrows. Unless otherwise specified, execution of the operations is not strictly limited, and the operations may be performed in other sequences. Moreover, at least part of the operations in some embodiments may include a plurality of operations or a plurality of stages. The operations or stages are not necessarily performed at the same moment but may be performed at different moments. Execution of the operations or stages is not necessarily performed in sequence, but may be performed with other operations or at least part of operations or stages of other operations.

Further is provided a video frame processing apparatus for implementing the foregoing video frame processing method.

Figure 15:
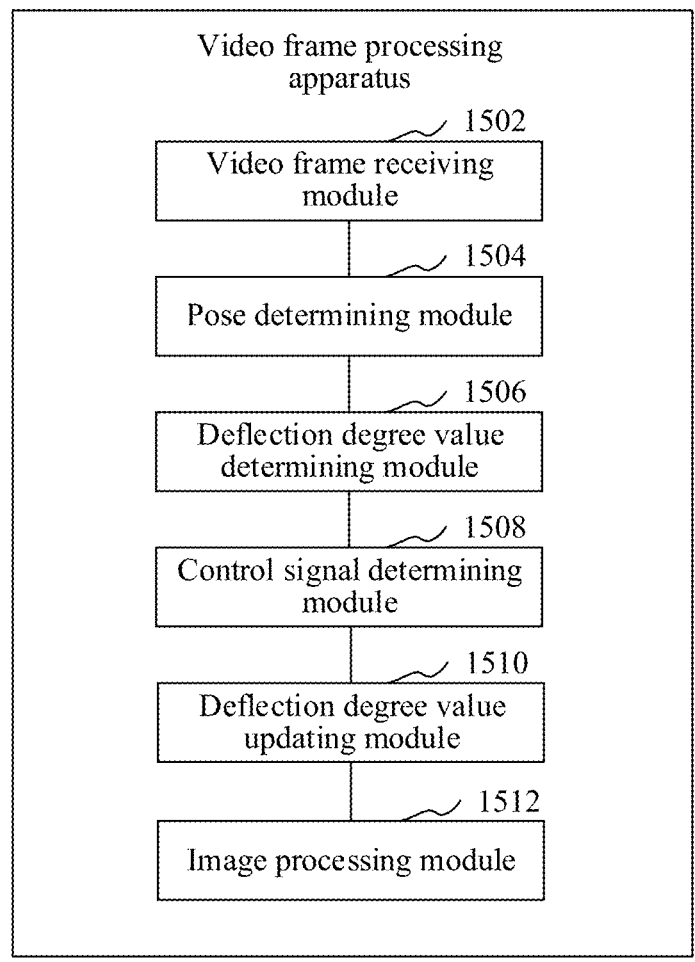
FIG. 15 is a structural block diagram of a video frame processing apparatus according to some embodiments.

In some embodiments, as shown in FIG. 15, a video frame processing apparatus is provided, including: a video frame receiving module 1502, a pose determining module 1504, a deflection degree value determining module 1506, a control signal determining module 1508, a deflection degree value updating module 1510, and an image processing module 1512.

The video frame receiving module 1502 is configured to receive a plurality of video frames carrying noise, the plurality of video frames including an object.

The pose determining module 1504 is configured to extract poses of a part of the object in the plurality of video frames.

The deflection degree value determining module 1506 is configured to determine, according to the poses of the part, deflection degree values of the part in the plurality of video frames.

The control signal determining module 1508 is configured to generate, based on the deflection degree values, a control signal.

The deflection degree value updating module 1510 is configured to perform backlash filtering on the control signal to obtain updated deflection values used for representing processing on the plurality of video frames.

The image processing module 1512 is configured to perform, based on the updated deflection values, image processing on the plurality of video frames in sequence.

In the foregoing video frame processing apparatus, a plurality of video frames carrying noise are received. Poses of a part of an object of the video frames are extracted. Deflection degree values of the part in the plurality of video frames are determined according to the poses of the part. A control signal is generated according to the deflection degree values. Backlash filtering is performed on the control signal to obtain updated deflection values used for representing processing on the plurality of video frames. Then, image processing is performed on the plurality of video frames in sequence based on the updated deflection values. Because the video frames carry noise, and the poses of the part are affected by the noise, the deflection degree values of the part are also affected by the noise, resulting in jitter on the control signal caused by the noise, and the updated deflection value are also affected by the noise, and consequently, jitter is generated when the image processing is performed on the video frame, for example, frequent switching between performing image processing on the video frame and not performing image processing on the video frame. According to the foregoing video frame processing method, the backlash filtering is performed on the control signal to filter out the jitter on the control signal caused by the noise and obtain the updated deflection values of the video frames. An impact of the noise on the updated deflection values is filtered out by the backlash filtering, and the jitter caused by the noise during performing the image processing on the video frame is also eliminated, so that stability of the video frame after the image processing is improved.

In some embodiments, the pose determining module 1504 is further configured to: extract points of the object from the plurality of video frames; and extract the poses of the part of the object in the plurality of video frames based on the points.

In some embodiments, the control signal determining module 1508 is configured to: obtain time sequence identifiers of the plurality of video frames; and generate the control signal according to the time sequence identifiers and the deflection degree values of the part in the plurality of video frames, the control signal being used for describing a trend of the deflection degree values changing over time.

In some embodiments, the plurality of video frames are video frames obtained in real-time, and the control signal is used for describing a trend of the deflection degree values changing over time.

The deflection degree value updating module 1510 is further configured to: determine a first deflection degree variation relative to a target inflection point in a process in which the deflection degree values in the control signal begin to increment over time; compare the first deflection degree variation with a backlash filtering coefficient to obtain a first comparison result; and use, in a case that the first comparison result indicates that the first deflection degree variation is less than or equal to the backlash filtering coefficient, an updated deflection value at the target inflection point as the updated deflection values used for representing processing on the plurality of video frames.

In some embodiments, the deflection degree value updating module 1510 is further configured to: compare, in a case that the first comparison result indicates that the first deflection degree variation is greater than the backlash filtering coefficient, the first deflection degree variation with a sum value to obtain a second comparison result, the sum value being obtained by summing the backlash filtering coefficient and a preset parameter; and perform, in a case that the second comparison result indicates that the first deflection degree variation is less than or equal to the sum value, linear transformation on the incremented deflection degree values to obtain the updated deflection values used for representing processing on the plurality of video frames.

In some embodiments, the deflection degree value updating module 1510 is further configured to: obtain, in a case that the second comparison result indicates that the first deflection degree variation is greater than the sum value, updated deflection values in a case that the first deflection degree variation is equal to the sum value; and use the obtained updated deflection values as the updated deflection values used for representing processing on the plurality of video frames.

In some embodiments, the deflection degree value updating module 1510 is further configured to: determine, in a case that it is detected that the deflection degree values in the control signal begin to decrement over time, a second deflection degree variation by using a deflection degree value beginning to decrement as a base value; and determine, according to an updated deflection value at a new target inflection point in a case that the second deflection degree variation is less than the backlash filtering coefficient, the updated deflection values used for representing processing on the plurality of video frames, the new target inflection point being an inflection point formed after the target inflection point.

In some embodiments, the deflection degree value updating module 1510 is further configured to: determine a first deflection degree variation relative to a target inflection point in a process in which the deflection degree values in the control signal begin to decrement over time; compare the first deflection degree variation with a backlash filtering coefficient to obtain a third comparison result; and use, in a case that the third comparison result indicates that the first deflection degree variation is less than or equal to the backlash filtering coefficient, an updated deflection value at the target inflection point as the updated deflection values used for representing processing on the plurality of video frames.

In some embodiments, the deflection degree value updating module 1510 is further configured to: compare, in a case that the third comparison result indicates that the first deflection degree variation is greater than the backlash filtering coefficient, the first deflection degree variation with a sum value to obtain a fourth comparison result, the sum value being obtained by summing the backlash filtering coefficient and a preset parameter; and perform, in a case that the fourth comparison result indicates that the first deflection degree variation is less than or equal to the sum value, linear transformation on the decremented deflection degree values to obtain the updated deflection values used for representing processing on the plurality of video frames.

In some embodiments, the deflection degree value updating module 1510 is further configured to: obtain, in a case that the fourth comparison result indicates that the first deflection degree variation is greater than the sum value, updated deflection values in a case that the first deflection degree variation is equal to the sum value; and use the obtained updated deflection values as the updated deflection values used for representing processing on the plurality of video frames.

In some embodiments, the deflection degree value updating module 1510 is further configured to: determine, in a case that it is detected that the deflection degree values in the control signal begin to increment over time, a second deflection degree variation by using a deflection degree value beginning to increment as a base value; and determine, according to an updated deflection value at a new target inflection point in a case that the second deflection degree variation is less than the backlash filtering coefficient, the updated deflection values used for representing processing on the plurality of video frames, the new target inflection point being an inflection point formed after the target inflection point.

In some embodiments, the part includes a face, and the poses includes pitch angles, yaw angles, and roll angles of the face in the video frames.

The deflection degree value determining module 1506 is further configured to: perform normalization on pitch angles, yaw angles, and roll angles of the face in the plurality of video frames to obtain a normalized pitch angle, a normalized yaw angle, and a normalized roll angle; determine a product value of the normalized pitch angle, the normalized yaw angle, and the normalized roll angle; and determine a deflection degree value of the face in each video frame based on the product value.

In some embodiments, the pose determining module 1504 is further configured to extract, in a case that an eye contact function item of an application is ON, poses of the face of the object in the plurality of video frames, the application being an application program playing the plurality of video frames.

In some embodiments, the image processing module 1512 is further configured to: obtain positions of an original eye feature point in the plurality of video frames; obtain a target eye feature point according to the updated deflection values; and fuse the target eye feature point into the plurality of video frames according to the positions, to replace the original eye feature point in the plurality of video frames.

In some embodiments, the part includes a hand. The image processing module 1512 is further configured to: obtain special effect data in a case that the updated deflection values satisfy a special effect adding condition; and add the special effect data in the plurality of video frames.

According to some embodiments, each module in the apparatus may exist respectively or be combined into one or more units. Certain (or some) unit in the units may be further split into multiple smaller function subunits, thereby implementing the same operations without affecting the technical effects of some embodiments. The modules are divided based on logical functions. In actual applications, a function of one module may be realized by multiple units, or functions of multiple modules may be realized by one unit. In some embodiments, the apparatus may further include other units. In actual applications, these functions may also be realized cooperatively by the other units, and may be realized cooperatively by multiple units.

A person skilled in the art would understand that these "modules" could be implemented by hardware logic, a processor or processors executing computer software code, or a combination of both. The "modules" may also be implemented in software stored in a memory of a computer or a non-transitory computer-readable medium, where the instructions of each module and unit are executable by a processor to thereby cause the processor to perform the respective operations of the corresponding module and unit.

In some embodiments, a computer device is provided. The computer device may be a terminal. A diagram of an internal structure of the computer device may be shown in FIG. 16. The computer device includes a processor, a memory, an input/output interface, a communication interface, a display unit, and an input apparatus. The processor, the memory, and the input/output interface are connected via a system bus, and the communication interface, the display unit, and the input apparatus are connected to the system bus via the input/output interface. The processor of the computer device is configured to provide computing and control capabilities. The memory of the computer device includes a non-volatile storage medium and an internal memory. The non-volatile storage medium has an operating system and a computer program stored thereon. The internal memory provides an environment for running of the operating system and the computer program in the non-volatile storage medium. The input/output interface of the computer device is configured to exchange information between the processor and an external device. The communication interface of the computer device is configured to communicate with an external terminal in a wire or wireless manner. The wireless manner may be implemented by using Wi-Fi, a mobile cellular network, near field communication (NFC), or another technology. When the computer program is executed by the processor, a video frame processing method is implemented. The display unit of the computer device is configured to form a visually visible picture, and may be a display screen, a projection apparatus, or a virtual reality imaging apparatus. The display screen may be a liquid crystal display or an e-ink display screen. The input apparatus of the computer device may be a touch layer covering the display screen, may be a button, a trackball, or a touchpad disposed on a housing of the computer device, or may be an external keyboard, touchpad, mouse, or the like.

Figure 16:
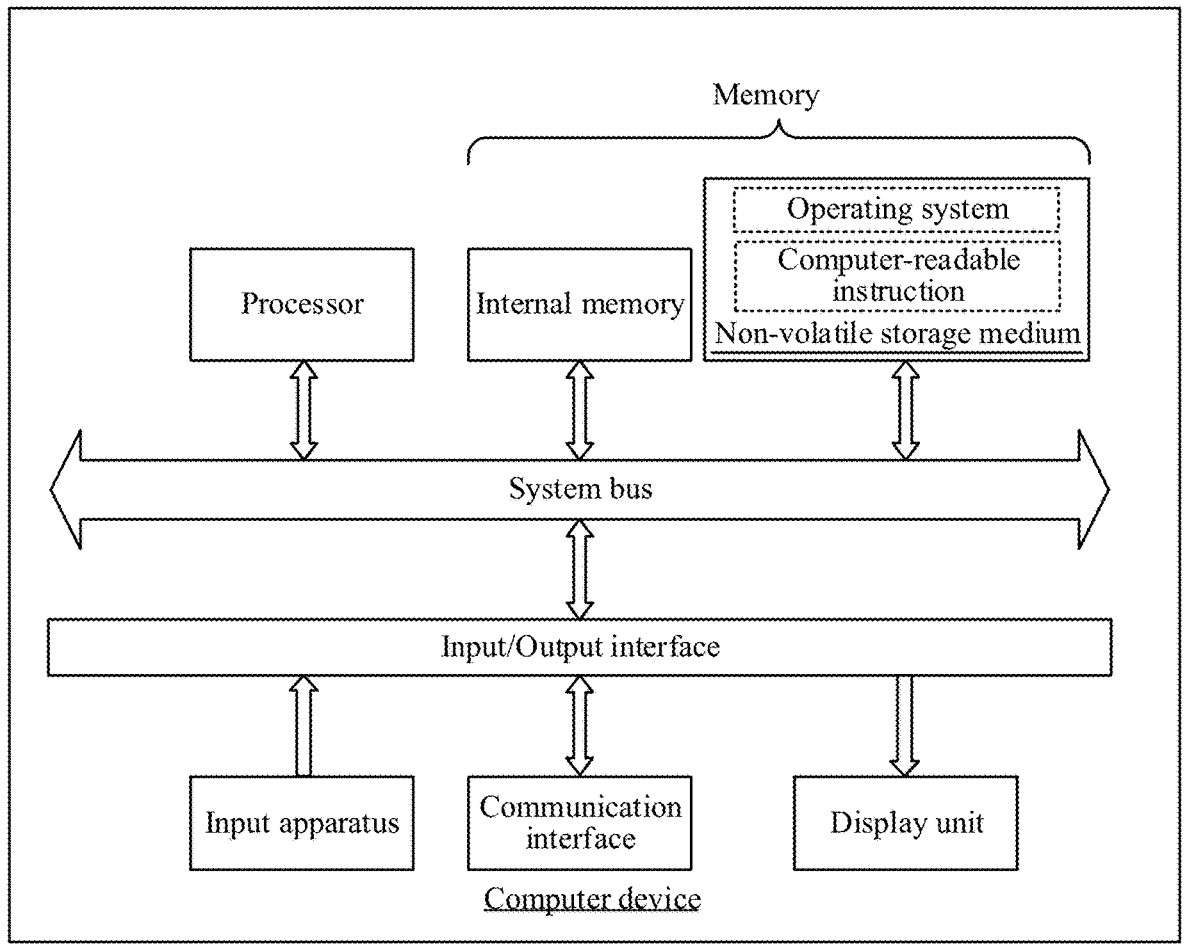
FIG. 16 is a diagram of an internal structure of a computer device according to some embodiments.

A person skilled in the art may understand that the structure shown in FIG. 16 is a block diagram of a partial structure related to some embodiments, and do not constitute a limitation to the computer device. The computer device may include more or fewer components than those shown in the figure, or some components may be combined, or a different component deployment may be used.

In some embodiments, a computer device is provided, including a memory and a processor, the memory having a computer program stored therein, and the processor executing the computer program to implement operations in the foregoing video frame processing method.

In some embodiments, a computer-readable storage medium is provided, having a computer program stored thereon, the computer program, when executed by a processor, implementing operations of the foregoing video frame processing method.

In some embodiments, a computer program product is provided, including a computer program, the computer program, when executed by a processor, implementing operations of the foregoing video frame processing method.

Video frames, user information (including but not limited to user image information, user equipment information, user personal information, and the like) and data (including but not limited to data used for analysis, stored data, displayed data, and the like) may include all information and data authorized by a user or fully authorized by all parties, and collection, use, and processing of relevant data may need to comply with relevant laws, regulations and standards of relevant countries and regions.

A person of ordinary skill in the art may understand that all or some of procedures of the method may be implemented by a computer program instructing relevant hardware. The computer program may be stored in a non-volatile computer-readable storage medium. When the computer program is executed, procedures of the foregoing method may be implemented. References to the memory, the database, or other medium used may all include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a grapheme memory, and the like. The volatile memory may include a random access memory (RAM), an external cache, or the like. As an illustration and not a limitation, the RAM may be in various forms, for example, a static random access memory (SRAM) or a dynamic random access memory (DRAM). The databases may include at least one of a relational database and a non-relational database. The non-relational database may include a blockchain-based distributed database and the like, which is not limited thereto. The processors may be a general-purpose processor, a central processing unit, a graphics processing unit, a digital signal processor, a programmable logic device, a data processing logic device based on quantum computing, and the like, which is not limited thereto.

Technical features may be randomly combined.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A video frame processing method, performed by a computer device, the method comprising:

receiving a plurality of video frames carrying noise, wherein the plurality of video frames comprise an object;

extracting a plurality of poses of a part of the object;

determining a plurality of deflection degree values of the part based on the plurality of poses;

generating a control signal based on the plurality of deflection degree values;

obtaining a plurality of updated deflection values based on backlash filtering of the control signal; and performing image processing on the plurality of video frames based on the plurality of updated deflection values.

2. The method according to claim 1, wherein the extracting the plurality of poses comprises:

extracting a plurality of points of the object; and extracting the plurality of poses based on the plurality of points.

3. The method according to claim 1, wherein the generating the control signal comprises:

obtaining a plurality of time sequence identifiers of the plurality of video frames; and generating the control signal based on the plurality of time sequence identifiers and the plurality of deflection degree values, and wherein the control signal describes a change of the plurality of deflection degree values over time.

4. The method according to claim 1, wherein the plurality of video frames are obtained in real-time, wherein the control signal describes a change of the plurality of deflection degree values over time, and wherein the obtaining the plurality of updated deflection values comprises:

determining a first deflection degree variation based on a target inflection point, based on a plurality of incrementing deflection degree values of the plurality of deflection degree values incrementing over time;

obtaining a first comparison result based on the first deflection degree variation and a backlash filtering coefficient; and determining the plurality of updated deflection values based on an updated deflection value at the target inflection point, based on the first deflection degree variation being less than or equal to the backlash filtering coefficient in the first comparison result.

5. The method according to claim 4, wherein the method further comprises:

obtaining a sum value based on a summation of the backlash filtering coefficient and a preset parameter;

obtaining a second comparison result based on the first deflection degree variation and the sum value, based on the first deflection degree variation being greater than the backlash filtering coefficient in the first comparison result; and obtaining the plurality of updated deflection values based on a linear transformation of the plurality of incrementing deflection degree values, based on the first deflection degree variation being less than or equal to the sum value in the second comparison result.

6. The method according to claim 5, wherein the method further comprises obtaining the plurality of updated deflection values based on the first deflection degree variation being equal to the sum value, based on the first deflection degree variation being greater than the sum value in the second comparison result.

7. The method according to claim 4, wherein the method further comprises:

determining a second deflection degree variation based on a plurality of decrementing deflection degree values of the plurality of deflection degree values decrementing over time; and determining the plurality of updated deflection values based on a new updated deflection value at a new target inflection point, based on the second deflection degree variation being less than the backlash filtering coefficient, and wherein the new target inflection point is formed after the target inflection point.

8. The method according to claim 1, wherein the plurality of video frames are obtained in real-time, wherein the control signal describes a change of the plurality of deflection degree values over time, and wherein the obtaining the plurality of updated deflection values comprises:

determining a first deflection degree variation based on a target inflection point, based on a plurality of decrementing deflection degree values of the plurality of deflection degree values decrementing over time;

obtaining a third comparison result based on the first deflection degree variation and a backlash filtering coefficient; and determining the plurality of updated deflection values based on an updated deflection value at the target inflection point, based on the first deflection degree variation being less than or equal to the backlash filtering coefficient in the third comparison result.

9. The method according to claim 8, wherein the method further comprises:

obtaining a sum value based on a summation of the backlash filtering coefficient and a preset parameter;

obtaining a fourth comparison result based on the first deflection degree variation and the sum value, based on the first deflection degree variation being greater than the backlash filtering coefficient in the third comparison result; and obtaining the plurality of updated deflection values based on a linear transformation of the plurality of decrementing deflection degree values, based on the first deflection degree variation being less than or equal to the sum value in the fourth comparison result.

10. The method according to claim 9, wherein the method further comprises obtaining the plurality of updated deflection values based on the first deflection degree variation being equal to the sum value, based on the first deflection degree variation being greater than the sum value in the fourth comparison result.

11. The method according to claim 8, wherein the method further comprises:

determining a second deflection degree variation based on a plurality of incrementing deflection degree values of the plurality of deflection degree values incrementing over time; and determining the plurality of updated deflection values based on a new updated deflection value at a new target inflection point, based on the second deflection degree variation being less than the backlash filtering coefficient, and wherein the new target inflection point is formed after the target inflection point.

12. The method according to claim 1, wherein the part comprises a face, wherein the plurality of poses comprise a plurality of pitch angles, a plurality of yaw angles, and a plurality of roll angles, and wherein the determining the plurality of deflection degree values comprises:

obtaining a normalized pitch angle based on normalization of the plurality of pitch angles;

obtaining a normalized yaw angle based on normalization of the plurality of yaw angles;

obtaining a normalized roll angle based on normalization of the plurality of roll angles;

determining a product value based on the normalized pitch angle, the normalized yaw angle, and the normalized roll angle; and determining the plurality of deflection degree values based on the product value.

13. The method according to claim 12, wherein the extracting the plurality of poses is based on an eye contact state of an application being a first value, and wherein the application is configured to play the plurality of video frames.

14. The method according to claim 13, wherein the performing the image processing comprises:

obtaining a plurality of positions of an original eye feature point of the plurality of video frames;

obtaining a target eye feature point based on the plurality of updated deflection values; and replacing the original eye feature point by fusing the target eye feature point into the plurality of video frames based on the plurality of positions.

15. The method according to claim 1, wherein the part comprises a hand, and wherein the performing the image processing comprises:

obtaining special effect data based on the plurality of updated deflection values satisfying a special effect adding condition; and adding the special effect data to the plurality of video frames.

16. A video frame processing apparatus, comprising:

at least one memory configured to store computer program code;

at least one processor configured to read the program code and operate as instructed by the program code, the program code comprising:

video frame receiving code configured to cause at least one of the at least one processor to receive a plurality of video frames carrying noise, wherein the plurality of video frames comprise an object;

pose determining code configured to cause at least one of the at least one processor to extract a plurality of poses of a part of the object;

deflection degree value determining code configured to cause at least one of the at least one processor to determine a plurality of deflection degree values of the part based on the plurality of poses;

control signal determining code configured to cause at least one of the at least one processor to generate a control signal based on the plurality of deflection degree values;

deflection degree value updating code configured to cause at least one of the at least one processor to obtain a plurality of updated deflection values based on backlash filtering of the control signal; and image processing code configured to cause at least one of the at least one processor to perform image processing on the plurality of video frames based on the plurality of updated deflection values.

17. The apparatus according to claim 16, wherein the pose determining code is further configured to cause at least one of the at least one processor to:

extract a plurality of points of the object; and extract the plurality of poses based on the plurality of points.

18. The apparatus according to claim 16, wherein the control signal determining code is configured to cause at least one of the at least one processor to:

obtain a plurality of time sequence identifiers of the plurality of video frames; and generate the control signal based on the plurality of time sequence identifiers and the plurality of deflection degree values, and wherein the control signal describes a change of the plurality of deflection degree values over time.

19. The apparatus according to claim 16, wherein the video frame receiving code is configured to cause at least one of the at least one processor to obtain the plurality of video frames in real time, wherein the control signal describes a change of the plurality of deflection degree values over time, and wherein the deflection degree value updating code is configured to cause at least one of the at least one processor to:

determine a first deflection degree variation based on a target inflection point, based on a plurality of incrementing deflection degree values of the plurality of deflection degree values incrementing over time;

obtain a first comparison result based on the first deflection degree variation and a backlash filtering coefficient; and determine the plurality of updated deflection values based on an updated deflection value at the target inflection point, based on the first deflection degree variation being less than or equal to the backlash filtering coefficient in the first comparison result.

20. A non-transitory computer-readable storage medium storing computer code which, when executed by at least one processor, causes the at least one processor to at least:

receive a plurality of video frames carrying noise, wherein the plurality of video frames comprise an object;

extract a plurality of poses of a part of the object;

determine a plurality of deflection degree values of the part based on the plurality of poses;

generate a control signal based on the plurality of deflection degree values;

obtain a plurality of updated deflection values based on
backlash filtering of the control signal; and perform image processing on the plurality of video frames
based on the plurality of updated deflection values.

* * * * *